US010181111B1

(12) United States Patent
Kohli et al.

(10) Patent No.: US 10,181,111 B1
(45) Date of Patent: Jan. 15, 2019

(54) ELECTRONIC DEVICE COMMUNICATIONS FOR ITEM HANDOFFS

(71) Applicant: Square, Inc., San Francisco, CA (US)

(72) Inventors: Avlok Kohli, San Francisco, CA (US); Amandeep Manik, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 314 days.

(21) Appl. No.: 14/993,149

(22) Filed: Jan. 12, 2016

(51) Int. Cl.
*G06Q 10/00* (2012.01)
*G06Q 10/08* (2012.01)
*G06Q 50/12* (2012.01)
*G01S 19/13* (2010.01)

(52) U.S. Cl.
CPC ........ *G06Q 10/08355* (2013.01); *G01S 19/13* (2013.01); *G06Q 10/0838* (2013.01); *G06Q 50/12* (2013.01)

(58) Field of Classification Search
CPC ..................... G06Q 10/08355; G06Q 30/0206
USPC ........................................... 705/15, 16, 7.16
See application file for complete search history.

(56) References Cited

U.S. PATENT DOCUMENTS

| | | | |
|---|---|---|---|
| 6,026,375 A | 2/2000 | Hall et al. | |
| 6,324,476 B1 | 11/2001 | Trovato | |
| 8,458,044 B2 | 6/2013 | Blair et al. | |
| 8,504,435 B2 | 8/2013 | Charles | |
| 9,269,103 B1 | 2/2016 | Kumar et al. | |
| 9,466,045 B1 | 10/2016 | Kumar | |
| 9,639,908 B1 | 5/2017 | Reiss et al. | |
| 9,679,489 B2* | 6/2017 | Lambert | G08G 1/123 |
| 9,811,838 B1* | 11/2017 | Daire | G06Q 30/0222 |
| 2002/0077937 A1 | 6/2002 | Lyons et al. | |
| 2002/0138350 A1 | 9/2002 | Cogen | |
| 2002/0143655 A1 | 10/2002 | Elston et al. | |
| 2002/0178074 A1 | 11/2002 | Bloom | |
| 2003/0125963 A1 | 7/2003 | Haken | |
| 2006/0235754 A1 | 10/2006 | Walker et al. | |

(Continued)

OTHER PUBLICATIONS

Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.

(Continued)

*Primary Examiner* — Rokib Masud
(74) *Attorney, Agent, or Firm* — Mattingly & Malur, PC

(57) ABSTRACT

In some examples, a service provider may determine a courier placement location for a service area and a courier inventory for the service area. Based on the inventory, the service provider may order first items from a first merchant and second items from a second merchant. The service provider may dispatch a first courier to pick up the first items and a second courier to pick up the second items. Further, a third courier may go to a handoff location to receive the courier inventory made up of first items picked up by the first courier and second items picked up by the second courier. In some examples, the handoff location is determined dynamically based on the current locations of the first, second, and third couriers and predicted courier travel times. Additionally, or alternatively, the handoff location may be determined based in part on the courier placement location.

21 Claims, 13 Drawing Sheets

(56) References Cited

U.S. PATENT DOCUMENTS

| | | |
|---|---|---|
| 2006/0293971 A1 | 12/2006 | Hunter et al. |
| 2007/0168118 A1 | 7/2007 | Lappe et al. |
| 2007/0185776 A1 | 8/2007 | Nguyen et al. |
| 2008/0052163 A1 | 2/2008 | Koh |
| 2008/0275643 A1 | 11/2008 | Yaqub et al. |
| 2009/0106124 A1 | 4/2009 | Yang |
| 2009/0187488 A1 | 7/2009 | Shamilian |
| 2009/0254445 A1 | 10/2009 | Bennett et al. |
| 2009/0281903 A1 | 11/2009 | Blatsein |
| 2009/0307096 A1 | 12/2009 | Antonellis |
| 2010/0076853 A1 | 3/2010 | Schwarz |
| 2010/0114790 A1 | 5/2010 | Strimling et al. |
| 2012/0036028 A1 | 2/2012 | Webb |
| 2012/0173308 A1 | 7/2012 | Brown et al. |
| 2012/0197722 A1 | 8/2012 | Mesaros |
| 2012/0203619 A1 | 8/2012 | Lutnick et al. |
| 2012/0303425 A1 | 11/2012 | Katzin et al. |
| 2013/0006747 A1 | 1/2013 | Wu |
| 2013/0046605 A1 | 2/2013 | Baron et al. |
| 2013/0054323 A1 | 2/2013 | Charles |
| 2013/0080204 A1* | 3/2013 | Khorashadi .......... G06Q 10/109 705/7.19 |
| 2013/0110396 A1* | 5/2013 | Choudhury ........ G01C 21/3438 701/468 |
| 2013/0151357 A1 | 6/2013 | Havas et al. |
| 2013/0218727 A1* | 8/2013 | Lutnick .................. G06Q 30/06 705/26.81 |
| 2013/0226651 A1 | 8/2013 | Napper |
| 2013/0246207 A1 | 9/2013 | Novak et al. |
| 2013/0290172 A1 | 10/2013 | Mashinsky |
| 2013/0317940 A1 | 11/2013 | Fitz |
| 2014/0011522 A1 | 1/2014 | Lin et al. |
| 2014/0074743 A1 | 3/2014 | Rademaker |
| 2014/0089135 A1 | 3/2014 | Linh et al. |
| 2014/0095311 A1 | 4/2014 | Bulloch, Jr. |
| 2014/0164126 A1 | 6/2014 | Nicholas et al. |
| 2014/0180959 A1* | 6/2014 | Gillen ................ G06Q 10/0838 705/341 |
| 2014/0188637 A1 | 7/2014 | Balasubramaniam et al. |
| 2014/0188650 A1 | 7/2014 | Sun et al. |
| 2014/0214465 A1 | 7/2014 | L'Heureux et al. |
| 2014/0226487 A1 | 8/2014 | Forssell et al. |
| 2014/0279081 A1 | 9/2014 | Marx et al. |
| 2014/0279667 A1 | 9/2014 | Gillen |
| 2014/0310196 A1 | 10/2014 | Yamamura |
| 2014/0343841 A1 | 11/2014 | Faaborg et al. |
| 2014/0370167 A1 | 12/2014 | Garden |
| 2015/0112774 A1 | 4/2015 | Georgoff et al. |
| 2015/0206093 A1 | 7/2015 | Trew et al. |
| 2015/0227888 A1 | 8/2015 | Levanon et al. |
| 2015/0227890 A1 | 8/2015 | Bednarek et al. |
| 2015/0262121 A1 | 9/2015 | Riel-Dalpe et al. |
| 2015/0269521 A1 | 9/2015 | Knapp et al. |
| 2015/0286984 A1 | 10/2015 | Dikman et al. |
| 2015/0294265 A1 | 10/2015 | Monteverde |
| 2015/0324717 A1 | 11/2015 | Lord et al. |
| 2015/0324729 A1 | 11/2015 | Lord et al. |
| 2015/0371317 A1 | 12/2015 | Bosko et al. |
| 2016/0048804 A1 | 2/2016 | Paul et al. |
| 2016/0063438 A1 | 3/2016 | Shuken et al. |
| 2016/0071050 A1 | 3/2016 | Kaye |
| 2016/0171591 A1 | 6/2016 | Williams et al. |
| 2016/0196525 A1 | 7/2016 | Kantor et al. |
| 2016/0196528 A1 | 7/2016 | Lemmon |
| 2017/0200218 A1 | 7/2017 | Napper |
| 2018/0047242 A1 | 2/2018 | Lutnick et al. |

OTHER PUBLICATIONS

Kauffman, R.J., and Wang, B., "Bid Together, Buy Together: On the Efficacy of Group-Buying Business Models in Internet-Based Selling," Carlson School of Management, last revised on May 16, 2001, pp. 1-44.

Non-Final Office Action dated May 26, 2015, for U.S. Appl. No. 14/625,680, of Kumar, A.R., et al., filed Feb. 19, 2015.

Non-Final Office Action dated Jun. 24, 2015, in U.S. App. No. 14/663,671, of Reiss, J.L., et al., filed Mar. 20, 2015.

Notice of Allowance dated Nov. 6, 2015, for U.S. Appl. No. 14/625,680, of Kumar, A.R., et al., filed Feb. 19, 2015.

Final Office Action dated Dec. 24, 2015, in U.S. Appl. No. 14/663,671, of Reiss, J.L., et al., filed Mar. 20, 2015.

Advisory Action dated Mar. 9, 2016, in U.S. Appl. No. 14/663,671, of Reiss, J.L., et al., filed Mar. 20, 2015.

Non-Final Office Action dated Oct. 6, 2016, for U.S. Appl. No. 14/663,671, of Reiss, J.L., et al., filed Mar. 20, 2015.

Notice of Allowance dated Dec. 22, 2016, for U.S. Appl. No. 14/663,671, of Reiss, J.L., et al., filed Mar. 20, 2015.

Non-Final Office Action dated Nov. 9, 2017, for U.S. Appl. No. 14/625,673, of Reiss, J.L., et al., filed Feb. 19, 2015.

Non-Final Office Action dated Feb. 28, 2018, for U.S. Appl. No. 14/642,875, of Reiss, J.L, et al., filed Mar. 10, 2015.

Non-Final Office Action dated Mar. 8, 2018, for U.S. Appl. No. 14/663,678, of Reiss, J.L., et al., filed Mar. 20, 2015.

Non-Final Office Action dated Jan. 11, 2018, for U.S. Appl. No. 14/625,683, of Kumar, A.R., et al., filed Feb. 19, 2015.

Non-Final Office Action dated Jan. 12, 2018, for U.S. Appl. No. 14/813,358, of Kohli, A., filed Jul. 30, 2015.

Non-Final Office Action dated Jan. 18, 2018, for U.S. Appl. No. 14/985,267, of Rhodes, M., et al., filed Dec. 30, 2015.

Non-Final Office Action dated Jan. 26, 2018, for U.S. Appl. No. 14/838,446, of Kohli, A., filed Aug. 28, 2015.

Non-Final Office Action dated Apr. 3, 2018, for U.S. Appl. No. 14/926,056, of Bernstein, B.R., et al., filed Oct. 29, 2015.

* cited by examiner

ELECTRONIC DEVICE COMMUNICATIONS FOR ITEM HANDOFFS

BACKGROUND

People may sometimes be at a location where they want food, but are not able to go to a restaurant or store. Accordingly, they may want to have food delivered to them. To meet this demand, a courier may obtain food prepared by a restaurant and deliver the food to a customer at a delivery location. For example, a service may enable customers to order food items, and may arrange for couriers to deliver the food items to the customers. However, conventional food deliveries can take a relatively long time between the time at which the customer places the order and the time at which the food is delivered to the customer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
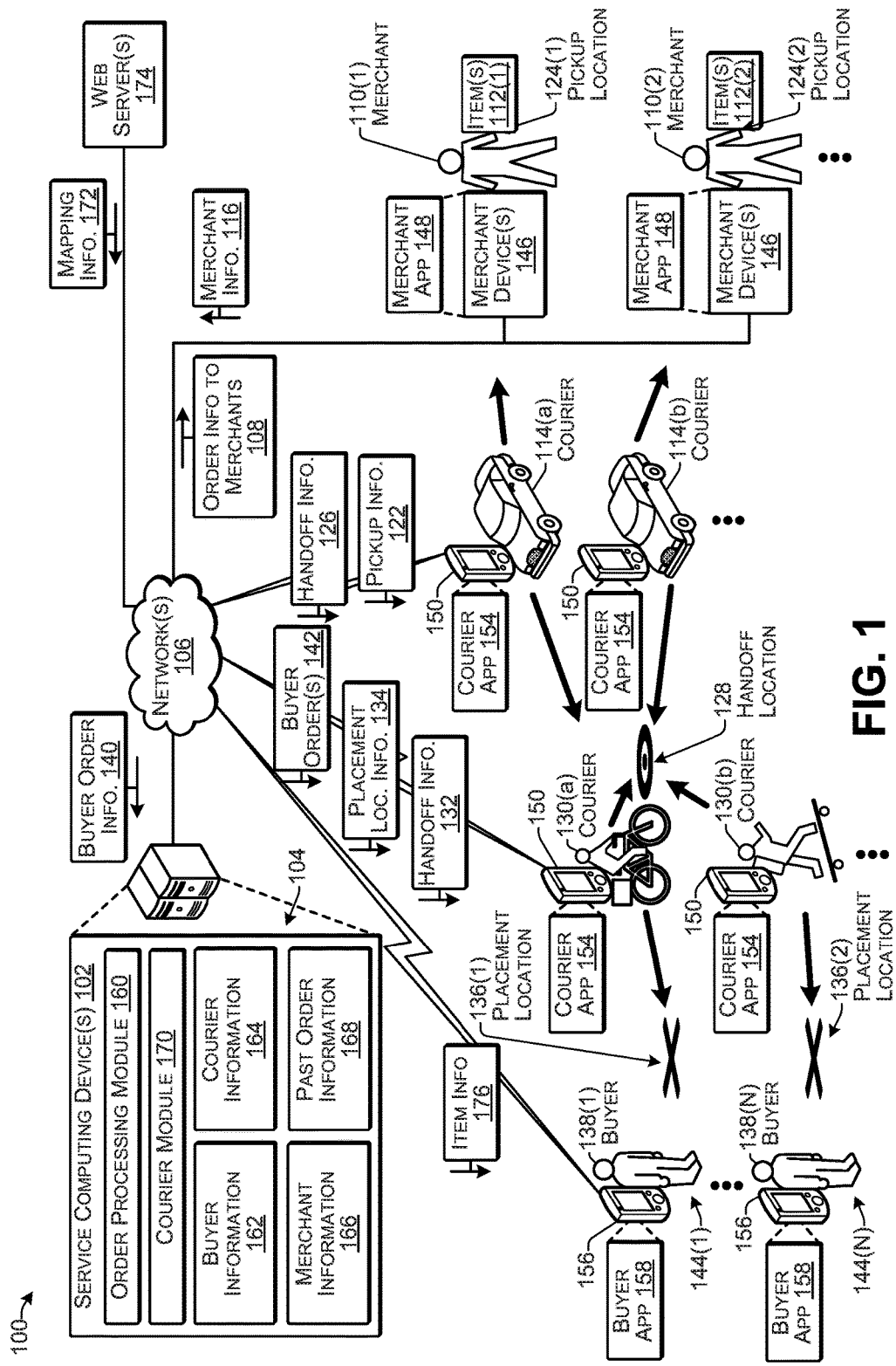
FIG. 1 illustrates an example system employing mobile devices and location sensors for handoff communications according to some implementations.

The technology herein includes novel arrangements and techniques for employing mobile devices and electronic communications in a courier network. Some examples include communications techniques for management of couriers and courier inventory, such as for enabling placement of couriers at courier placement locations before orders are received. For instance, through the interaction of a plurality of computing devices, mobile devices, and location sensors, some examples herein determine optimal item handoff locations, optimal courier placement locations, and optimal courier inventory for providing fast delivery of items to buyers. In some cases, the location sensors on respective mobile devices of a plurality of couriers may be used to establish ad hoc handoff locations for providing inventories of items to couriers for delivery to buyers.

As one example, one or more first couriers may serve as an item pick up source for a plurality of second couriers who each transport an inventory of items to a service area for subsequent delivery to buyers. For instance, a courier A may pick up 50 first items from a first merchant and a courier B may pick up 50 second items from a second merchant. Couriers A and B may transport the respective first and second items to a handoff location, such as near to a service area from which a number of orders are predicted to be received. In some cases, the handoff location may be a temporary or permanent established location. In other cases, the handoff location may be determined on the fly based on relative current locations of the couriers involved in the handoff transaction.

A plurality of second couriers may meet the first couriers A and B at the handoff location. Each second courier may fill his or her inventory by picking up a portion of the first items from courier A and a portion of the second items from courier B. For instance, the ratio of first items to second items in each second courier's inventory may be specified by the service provider, such as based on past orders associated with a respective service area to which each courier will travel. The service provider may specify a courier placement location to which each courier is to travel and wait for orders to be received from buyers. Thus, the second couriers are positioned to deliver the items to buyers within a threshold time window that is significantly shorter than is customary for conventional delivery services.

Accordingly, the service provider may provide a delivery service that enables buyers to order items, such as food items, that are delivered by couriers. For instance, an item may typically be delivered to a buyer within a relatively brief threshold time (e.g., 5-15 minutes after ordering) that is substantially less than conventional delivery times. As mentioned above, the items may have already been procured by the couriers and can therefore be delivered quickly by the couriers based on the couriers being stationed proximal to predicted buyer locations. For instance, a courier may pick up multiple items of different item categories at a handoff location in advance of receiving any buyer orders. The courier may then travel to a recommended courier placement location indicated by the service provider and wait for buyers to place orders. The service provider may determine the recommended courier placement location based on past orders and/or based on other factors, such as a number of buyers opening a buyer application but not being able to place an order due to no available couriers being positioned nearby.

In some cases, the service provider may use clustering techniques to determine a group of past order delivery locations that are within a threshold distance of each other. As one example, the threshold distance may be determined based on a courier being able to travel between the delivery locations within a threshold time, such as less than 15 minutes. Further, in some examples, a centroid of the cluster may be determined and a recommended courier placement location may be determined based in part on the centroid location, while also taking into consideration other factors such as accessibility by the courier.

In addition, in some cases, one or more additional couriers may be utilized. For instance, in the example above, the first couriers A and B may act as runners between the merchants and the handoff location, while a third courier may be stationed at the handoff location to receive the ordered items from the first couriers, organize recommended quantities of each category of item into courier inventories, and handoff the inventories to the second couriers. Thus, the third courier may check in the orders delivered by the first couriers, consolidate inventories before the second couriers arrive, may ensure that inventory requirements for each second courier are met, and may check out the inventories to the second couriers who will deliver the ordered items to the buyers.

A buyer may use a buyer application on a buyer device, such as a mobile device or other computing device, to determine the items currently available for delivery to the buyer's delivery location. When the buyer opens the buyer application, the service provider may determine whether a courier is within a threshold delivery travel time of the buyer's delivery location, and if so, may determine the current inventory of the courier. Based on the available inventory of the courier that is within the threshold delivery travel time of the buyer, the service provider may send item information to the buyer device. The item information received by the buyer device may cause the buyer application on the buyer device to indicate that one or more of the items in the courier's inventory are available for delivery. For example, if the courier currently has an inventory of five burritos and three cheeseburgers, the buyer application may indicate to the buyer that one or more burritos and one or more cheeseburgers are available for delivery within the threshold time based at least in part on determining the delivery travel time from the courier to the buyer's delivery location.

In addition, the service areas for particular buyers may change dynamically based on the availability and/or inventory of the couriers currently in a region proximate to the particular buyers. For example, if there are no couriers currently within a threshold delivery travel time of a particular buyer, the application on the buyer's mobile device may indicate that no items are currently available. Thus, the buyer is treated as being outside of any current service area. This indication of unavailability may continue until a courier having one or more items is within a threshold delivery travel time of the particular buyer's delivery location, thus ensuring that when the buyer orders an item, the delivery will be completed within the threshold time period for delivery. In some examples, the buyer may be able to place an advance order for an item, such as if the buyer is within a threshold delivery travel time of a courier placement location at which a courier will be stationed in the future.

In the examples herein, an order may include a request submitted by a buyer (e.g., a customer) for the acquisition of a food item from a courier. The order information may be received by the service provider and may be sent by the service provider to the courier. An order may also be placed by the service provider for obtaining items from a merchant. A merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases an item delivered by a courier. Buyers may include customers and potential customers. The service provider may provide payment to the merchant for the picked up items, provide payment to the courier for delivering the items, and may receive payments from the buyers for the delivered items.

For discussion purposes, some example implementations describe a technological architecture enabling first couriers to handoff inventories of items to second couriers who delivery the items to buyers. However, implementations herein are not limited to the particular examples provided, and may be extended to other service environments, other system architectures, other types of goods, other courier arrangements, and so forth, as will be apparent to those of skill in the art in light of the disclosure herein.

FIG. 1 illustrates an example system 100 enabling communication techniques for fast item deliveries according to some implementations. The system 100 includes one or more service computing devices 102 of a service provider 104 that may send, over one or more networks 106, order information 108 to a plurality of merchants 110(1), 110(2), . . . . The order information 108 sent to a selected merchant 110 may identify items 112 that will be picked up from the selected merchant 110 by a first courier 114. For instance, each merchant 110(1), 110(2), . . . , may offer one or more categories of items 112(1), 112(2), . . . , respectively. Examples of item categories include different types of entrée-sized items, such as burgers, burritos, salads, soups, sandwiches, and other types of entrées that may be packaged and delivered without suffering significant degradation in quality or other spoilage.

In some cases, the order information 108 may also specify a time at which the order is to be picked up by one of a plurality of first couriers 114(a), 114(b), For instance, the service provider 104 may predict a number of each item 112 to order from particular merchants 110. As one example, suppose that the service provider 104 orders 50 items 112(1) of a first category, such as burritos, from the first merchant 110(1) and 40 items 112(2) of a second category, such as cheeseburgers, from the second merchant 110(2). In response, each merchant 110 that receives an order may respond with merchant information 116. For example, the merchant information 116 sent by each merchant 110 to the service computing device 102 may confirm that a respective item order will be ready by the respective pickup time specified by the service computing device 102, or, alternatively, may provide a revised pickup time.

In some cases, based on the predicted preparation time for the first items 112(1) being prepared by the first merchant 110(1), the service provider 104 may request that the second merchant 110(2) delay the preparation of the second items 112(2) so that the pickup times for the first items 112(1) and second items 112(2) may be timed so that the first couriers 114 are able to handoff the respective items 112(1), 112(2) at a desired timing. Alternatively, in other examples, the order information 108 sent to a selected merchant 110 may include an inquiry as to when the ordered items 112 will be prepared and ready for pick up, and the merchant 110 may include with the merchant information 116 a specified time at which the order will be ready for pickup.

In addition, such as in response to receiving the merchant information 116 from the particular merchant 110, the service computing device 102 may send pickup information 122 to the first courier(s) 114 who will pick up the ordered items from the selected merchants 110. For example, the service computing device 102 may send pickup information 122 than includes a respective pickup location 124(1), 124(2) associated with a respective merchant 110(1), 110(2) from whom the first courier 114 is to pick up a quantity of an item 112. For instance, each merchant 110(1), 110(2) may be associated with a merchant pickup location 124(1), 124(2), respectively, which may typically be the merchant's place of business. In this example, suppose that a courier 114(a) is requested to pick up the 50 items 112(1) of the first item category, i.e., the burritos, from the first merchant 110(1) and a courier 114(b) is requested to pick up the 40 items 112(2) of the second item category, i.e., the cheeseburgers, from the second merchant 112(2).

Further, the service computing device 102 may send handoff information 126 to the first couriers 114(a), 114(b) to request that the couriers 114(a), 114(b) proceed to a handoff location 128 following pick up of the respective items 112(1) and 112(2) from the respective merchants 110(1) and 110(2). Alternatively, in some cases, a single courier 114 may pick up the items 112(1) and 112(2) from both merchants 110(1) and 110(2), such as in the case that the merchants 110(1) and 110(2) are within a threshold proximity of each other. For instance, the threshold proximity may be determined such that the freshness of the items 112 picked up first is not significantly impacted by having a single courier pickup both orders of items 112(1) and 112(2), and also such that the arrival of the courier to the handoff location 128 is not significantly delayed. In addition, the handoff information 126 may indicate how many of each item 112(1), 112(2) the first couriers 114(a), 114(b), respectively, are to handoff to one or more of a plurality of second couriers 130(a), 130(b), . . . at the handoff location 128.

In addition, the service computing device 102 may send handoff information 132 to the second couriers 130(a), 130(b). For example, the service computing device 102 may send, to selected second couriers 130, an indication of the handoff location 128 at which the second couriers 130 are to receive an inventory of items 112(1) and 112(2). The handoff information 132 may further indicate how many of each item 112(1) and 112(2) (i.e., how many burritos and how many cheeseburgers in this example) the particular courier 130 is to receive. Thus, the inventory of each second courier 130(a), 130(b) may include a combination of the first items 112(1) and the second items 112(2), and the ratio of the items of different categories in the inventory may vary among the couriers 130 based on predicted sales in the service area that each courier 130 will service. In addition, the service computing device 102 may send courier placement location information 134 to each of the second couriers 130(a), 130(b) to indicate recommended courier placement locations 136(1), 136(2), respectively, to which the second couriers 130(a), 130(b) are to proceed after receiving their respective inventories of items at the handoff location 128. Accordingly, a selected second courier 130 receives an inventory of items 112(1) and 112(2) from the first couriers 114 at the handoff location 128 and may subsequently travel to a recommended courier placement location 136 to wait for orders to be received from buyers 138. Further, in some cases, a particular courier may receive more than two categories of items, while in other cases, a particular courier may receive only a single category of item.

In some examples, a large number of buyers 138(1)-138(N) may use the system 100 for placing delivery orders. For instance, individual buyers 138 may place orders for one or more of the items 112(1) and/or 112(2). The ability of the buyer 138 to order a particular item 112 at any point in time may depend on the current available inventory of the courier(s) 130 that are within a threshold distance of the buyer 138. The service computing device 102 may receive buyer order information 140 for least one order placed by at least one buyer 138. Based on the buyer order information 140 received from a particular buyer 138, the service computing device 102 may send a buyer order 142 to a particular second courier 130 that is within the threshold distance of a delivery location 144 associated with the particular buyer 138. For instance, each order may be associated with a respective delivery location 144(1)-144(N) associated with a respective buyer 138(1)-138(N). The buyer order 142 sent to the second courier 130 may include the respective delivery location 144 for the order and information about the item(s) ordered. As orders are received from respective buyers 138, a respective courier 130 is requested to deliver the ordered item(s) to each respective buyer 138 who placed an order. The service provider may track the courier inventory and may cease taking orders when the number of orders received equals the number of items in the inventory.

In the illustrated example, the service computing device 102 of the service provider 104 is able to communicate with merchant devices 146 over the one or more networks 106. Each merchant device 146 may be associated with a respective merchant 110(1), 110(2), . . . . Each merchant device 146 may be a computing device, such as a desktop, laptop, tablet, smart phone, or the like, and may include a respective instance of a merchant application 148 that executes on the respective merchant device 146. For example, the merchant application 148 may be configured to communicate with the service computing device 102, such as for receiving the order information 108 and for sending the merchant information 116. In some examples, the merchant application 148 and the service computing device 102 may communicate with each other via one or more application programming interfaces (APIs).

Further, the merchant device 146 may include one or more output devices, such as speakers (not shown in FIG. 1), that the merchant application 148 may use to audibly notify the associated merchant 110 that an order has been received. Additionally, or alternatively, the merchant device 146 may include a display (not shown in FIG. 1) that the merchant application 148 may use for presenting the order information 108 to the merchant 110. For instance, the merchant application 148 executed on the merchant device 146 may present the order information 108 in one or more graphic user interfaces (GUIs).

In some examples, the merchant application 148 may provide point-of-sale (POS) functionality to the merchant device 146 to enable the associated merchant 110 to accept payments from walk-in/walk-up customers using the merchant device 146. Alternatively, in some examples, the merchant device 146 may include a fax machine and the merchant 110 may receive the order information 108 via a facsimile transmission from the service computing device 102. As still another example, the merchant device 146 may include a computing device that is configured to receive order information via email, instant messaging, or other electronic communication. As still another example, the merchant device 146 may include a phone, and the merchant device 146 may receive the order information 108 via an SMS text message, voicemail, telephone call, or the like.

In addition, the first couriers 114 and second couriers 130 may be associated with courier devices 150, which may execute respective instances of a courier application 154. For example, couriers 114 and 130 may use the courier devices 150, such as smart phones, tablet computers, wearable computing devices, laptops, or the like, and these courier devices 150 may each have installed thereon an instance of the courier application 154. The courier application 154 may program the courier device 150 to receive the pickup information 122, the handoff information 126, 132, the courier placement location information 134, and/or the buyer orders 142 from the service computing device 102, such as to provide the first couriers 114 with information for picking up orders from merchants and handing off items to second couriers 130 at the handoff location 128. The courier application 154 may further provide information to the second couriers 130 for receiving items at the handoff location 128, traveling to the courier placement location 136, and delivering items to buyers in response to buyer orders.

Additionally, the courier application 154 may provide the service computing device 102 with an indication of the current location of each courier 114 and 130. For instance, one or more location sensors associated with each courier device 150 may be used to determine location information and, based on this, the courier application 154 of an active courier 114, 130 may send location information to the service computing device 102, such as by providing an indication of a geographic location of each courier device 150 of each active courier. Thus, a subset of courier devices 150 associated with active couriers 114, 130 may communicate with the service computing device 102, and may send location information obtained from one or more location sensors associated with each courier device 150, such as a GPS (Global Positioning System) receiver (not shown in FIG. 1).

In some cases, another subset of courier devices 150 associated with couriers who are currently inactive (i.e., off duty) may be periodically pinged by the service computing device 102 to determine interest in becoming active and, if so, requesting current location information of the associated inactive courier. Couriers who are interested in being activated may allow their courier devices device 150 to respond with their location information, while those who are not interested in being activated may keep their location information private by not responding. In some examples, the courier application 154 and the service computing device 102 may communicate with each other via one or more APIs. Alternatively, in other examples, the courier device 150 may receive the pickup information 122, the handoff information 126, 130, the courier placement location information 134, and/or the buyer orders 142 via an SMS text message, a voicemail, a telephone call, or the like.

In addition, each buyer 138 may be associated with a buyer device 156 that may execute a respective instance of a buyer application 158. For example, the buyer 138 may use the buyer device 156, such as a smart phone, tablet computer, wearable computing device, laptop, desktop, or the like, and the buyer device 156 may have installed thereon the buyer application 158. The buyer application 158 may enable the buyer 138 to select one or more of the items 112 to be delivered to the buyer 138 by one or more of the couriers 114. For example, the buyer application 158 may present one or more GUIs on a display for enabling the buyer 138 to select one or more of the items 112 for an order.

Furthermore, the buyer order information 140 received from the buyer may indicate the buyer delivery location 144. For example, the buyer delivery location 144 may be determined by the buyer application 158 from a GPS receiver (not shown in FIG. 1) associated with the buyer device 156. The buyer application 158 may use this location information as the delivery location 144 for a particular order. In other examples, the buyer 138 may manually enter an address into the buyer application 158 that may be used as the delivery location 144 for an order. The buyer application 158 may store the delivery location 144 used for a past order so that the buyer 138 does not have to reenter the delivery location for a subsequent order. In some examples, the buyer application 158 may use the location information from the GPS receiver on the buyer device 156 to confirm that an assumed delivery location for a current order corresponds to a previously entered delivery location. If there is a discrepancy, the buyer application 158 may request that the buyer 138 select a delivery location prior to presenting other user interfaces on the buyer device 156.

The buyer application 158 may further enable the buyer 138 to make a payment for an order for items from multiple couriers as a single transaction using the buyer application 158. For instance, the service provider 104 may charge a buyer account associated with the buyer 138 for an amount associated with a particular order. The courier 130(*a*) may deliver part of the order and the courier 130(*b*) may deliver another part of the order, such as in the case one of the couriers has an item in inventory that the other does not.

In some examples, the buyer application 158 and the service computing device 102 may communicate with each other via one or more APIs. Additionally, or alternatively, the buyer application 158 may be a web browser, or the like, and the buyer 138 may navigate to a website associated with the service provider 104, and may use the website associated with the service provider 104 to place an order. In this case, the website may provide at least some of the functionality attributed to the buyer application 158 herein.

The one or more networks 106 can include any appropriate network, including a wide area network, such as the Internet; a local area network, such as an intranet; a wireless network, such as a cellular network, a local wireless network, such as Wi-Fi and/or short-range wireless communications, such as BLUETOOTH® and BLUETOOTH® low energy; a wired network, including fiber optics and Ethernet; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 146, the buyer devices 156, and/or the courier devices device 150 are able to communicate over the one or more networks 106 using wired or wireless connections, and combinations thereof.

In the illustrated example, the service computing device 102 includes an order processing module 160 that may be executed on the service computing device 102 to provide, at least in part, the order processing functionality attributed to the service computing device 102. The order processing module 160 may receive the buyer order information 140 from the buyers 138 and may associate the buyer order information 140 with buyer information 162. For instance, based on buyer identifying information that may be included with the buyer order information 140, the order processing module 160 may associate particular order information 140 with a particular buyer account. The order processing module 160 may access a buyer account included in the buyer information 162 to charge a particular buyer account for a particular buyer order. In some examples, as discussed additionally below, the order processing module 160 may access courier information 164 to determine the current location and inventories of couriers before confirming a buyer's order.

Furthermore, when placing an order for items from the merchants 110, the order processing module 160 may access merchant information 166. The order processing module 160 may access the merchant accounts of particular merchants, which may be identified in the merchant information 166, to determine contact information for sending the merchant order information 108 to the correct merchant device 146 so that the particular merchant 110 can receive an order a plurality of items 112 from the service provider 104. The order processing module 160 may further access the merchant account of the particular merchant 110 to credit payment to the particular merchant that prepares the ordered items. In some examples, as discussed additionally below, the order processing module 160 may access past order information 168 when determining which items 112 to order, and how many of each item 112 to order from selected merchants 110.

The order processing module 160 may store information associated with each buyer order as past order information 168. For instance the past order information 168 may include a day of the week, date, and time of day at which each order is received from the respective buyer 138. The past order information 168 may further include, for each order: items ordered; merchant identifying information; buyer identifying information; the pickup location; the handoff location; the delivery location; location of the courier when the order was received; location of the courier when the job for delivery of the order was accepted by the courier; time that the order was delivered; amount paid for the order; feedback including records of any complaints or indications of spoilage; as well as other information, as discussed additionally below.

In addition, the past order information 168 may include information about orders made to merchants 110 by the order processing module 160. For instance, the past order information 168 may include the quantity of each item ordered from each merchant, the time each order was placed, the time each order was ready, the time each order was picked up by a courier, whether any of the items ordered were left unsold, whether any complaints about spoilage were received from buyers, or the like.

The service computing device 102 may further include a courier module 170 that may be executed by the service computing device 102 to manage couriers 114, 130 and to communicate with the couriers 114, 130. For instance, the courier module 170 may determine courier locations based on location information received from each courier device 150, and may coordinate timing of the couriers' interactions with other couriers, such as for arranging handoffs between the first couriers 114 and the second couriers 130 at handoff locations. Further, the courier module 170 may use clustering techniques or other algorithms for determining courier placement locations 136 for the second couriers 130 and for determining quantities of items for courier inventories. In addition, the courier module 170 may track the inventory of each courier 130 and may determine which couriers are within a threshold distance of a buyer location, such as for determining which items a particular buyer may be able to order.

In addition, the courier module 170 may access the courier information 164 to determine courier contact information for sending the pickup information 122 and the handoff information 126 to particular first couriers 114, and for sending the handoff information 132, the courier placement location information 134, and the buyer orders 142 to the second couriers 130. The couriers 114, 130 may use the courier application 154 on their respective courier devices 150 to receive the respective messages, and to respond when appropriate, such as with acceptance of a pickup or delivery assignment. Further, in some examples, a third courier (not shown in FIG. 1) may be stationed at the handoff location 128, such as for receiving orders picked up from the merchants by the first couriers 114 and for handing off inventories of items to the second couriers 130. As one example, the third courier may set up a stand, or the like, to enable other couriers to easily locate the handoff location 128.

In some examples, the handoff location 128 may be a permanent or temporary location, such as a building, a tent, a stand, a truck, a kiosk, or the like. In other examples, the handoff location 128 may be determined dynamically, such as based on the relative locations of the couriers 114, 130 who are participating in the handoff and/or other factors. For example, the courier module 170 may determine the relative positions of the couriers 114, 130, and may determine a suitable handoff location for the couriers 114, 130 based at least in part on the relative positions and the predicted travel times of each of the couriers in a direction toward each other and/or toward one or more service areas.

In some cases, the merchants may be stationary and may be at a permanent location. In other cases, the merchants may be mobile or semi-mobile, and may be at a location temporarily. Accordingly, in the case that one or more of the merchants are mobile, the handoff location 128 may be established in the dynamic manner discussed above based on the relative geographic locations of at least some of the couriers 114, 130 participating in the handoff. Further, in some cases, as discussed additionally below, multiple handoff locations may be employed, such as for handing off items to courier 130(a) near the first placement location 136(1) and handing off items to courier 130(b) near the second placement location 136(2). Thus, the handoff location 128 may be created temporarily and spontaneously, and may change periodically, day-to-day, etc.

The second courier 130 may pick up an inventory of items from the first couriers 114 at the handoff location 128 and travel toward a recommended courier placement location 136. In some cases, the courier placement location 136 may be determined based on a cluster of past delivery locations determined from the past order information 168. As discussed additionally below, the courier module 170 may determine distances between past delivery locations, and may identify a cluster of past delivery locations based on the distances between the delivery locations in the cluster being less than a threshold distance. For instance, the courier module 170 may receive or otherwise access mapping information 172, such as from a web server 174, an internal database (not shown), or the like, to determine relative distances between the past delivery locations. Furthermore, the courier module 170 may determine a centroid of the cluster, and may determine a courier placement location 136 based at least in part on the centroid, such as near to the centroid or near to a suitable location determined based on the centroid, as well as other considerations. For instance, it may be desirable for the courier placement location 136 be easily accessible by the couriers while also being in a location that does not block traffic, pedestrians, or the like, rather than at an exact centroid location.

In addition, prior to enabling a buyer 138 to place an order, the courier module 170 may determine that at least one second courier 130 is within a threshold delivery travel time of the delivery location 144 of the particular buyer 138, and that the at least one courier 130 has an inventory of one or more items 112 available to fulfill an order of the particular buyer 138. For example, when a buyer 138 opens the buyer application 158, the courier module 170 may determine a current courier location associated with each second courier 130(a), 130(b), . . . . Furthermore, the order processing module 136 may determine which of these couriers 130 are within a threshold distance, or otherwise within a threshold delivery travel time of the anticipated delivery location 144 of the particular buyer 130. As an example, the threshold distance may be determined based on how far a courier 130 is predicted to be able to travel within 10-15 minutes or less, e.g., whether the courier travel time will take more than 10-15 minutes for the particular courier 130 to arrive at the delivery location 144 of the particular buyer 138. If the predicted travel time is greater than the threshold time, then the courier 114 may be treated as being outside of the threshold distance from the particular buyer 110.

Furthermore, of the couriers 130 that are determined to be within the threshold distance of the particular buyer delivery location 144, the courier module 170 may determine a current inventory of each of these couriers 130. For instance, the courier information 164 maintained by the service computing device 102 may include courier inventory information. When the buyer 138 opens the buyer application 158, such as for placing an order, the courier module 170 may determine that there is currently at least one courier 130 within the threshold delivery travel time of the buyer delivery location 144 and that the courier 130 currently has at least one unsold item 112 in the courier's inventory.

Based on determining that there is a courier 130 having one or more unsold items 112 and further determining that the courier 130 is within the threshold distance of the buyer delivery location 144, the courier module 170 may send (or may cause the order processing module 160 to send) item information 176 to the particular buyer device 156. The item information 176 may indicate a number and categories of items 112 that are currently available in the inventory of the courier 130 that is within the threshold distance of the particular buyer delivery location 144. Accordingly, the courier information 164 may keep track of how many items 112 each courier 130 currently has in the respective courier's inventory. Furthermore, if there are multiple couriers 130 within the threshold distance of the buyer delivery location 144, the item information 176 may include information about the items 112 in the respective inventories of each of the multiple couriers 130. For instance, one courier 130 may have an inventory that only has a first category of item remaining, such as burritos, while another courier 130 may have an inventory that only has a different category of item remaining, such as cheeseburgers, salads, sandwiches, etc. Alternatively, both couriers may have inventories of the same categories of items. In response to receiving the item information 176, the buyer application 158 may present one or more user interfaces to enable the buyer 138 to place an order for a number of items 112 up to the total number of items currently available and unsold in the courier's inventory.

In response to receiving an order from a buyer device 156, the order processing module 160 may send the buyer order 142 to the particular courier 130 that was determined to be within the threshold distance of the buyer's delivery location 144. For instance, the order information 142 may request that the particular courier 130 deliver the ordered item(s) 112 to the particular buyer's specified delivery location 144. Furthermore, the order processing module 160 may change the inventory information associated with the selected courier 130 to subtract the number of items ordered by the particular buyer 138 from the current inventory of the selected courier 130.

The selected courier 130 may use the courier application 154 on the courier device 150 to receive a message with the buyer order 142, and to respond with a reply message indicating acceptance of the delivery job. The selected courier 130 may subsequently deliver the ordered item(s) 112 to the particular buyer 138 at the indicated delivery location 144. When the courier 130 has completed delivery of the item(s) 112 to the delivery location 144, the courier 130 may use the courier application 154 to inform the order processing module 160 that the delivery to the buyer has been completed. In some examples, the order processing module 160 may access a courier account included in the courier information 164 for the selected courier 130 to credit the courier account of the selected courier 114 with payment for the delivery job. Further, the order processing module 160 may access the buyer information 162 to charge the account of the buyer, and may record information about the buyer's order in the past order information 168.

Figure 2:
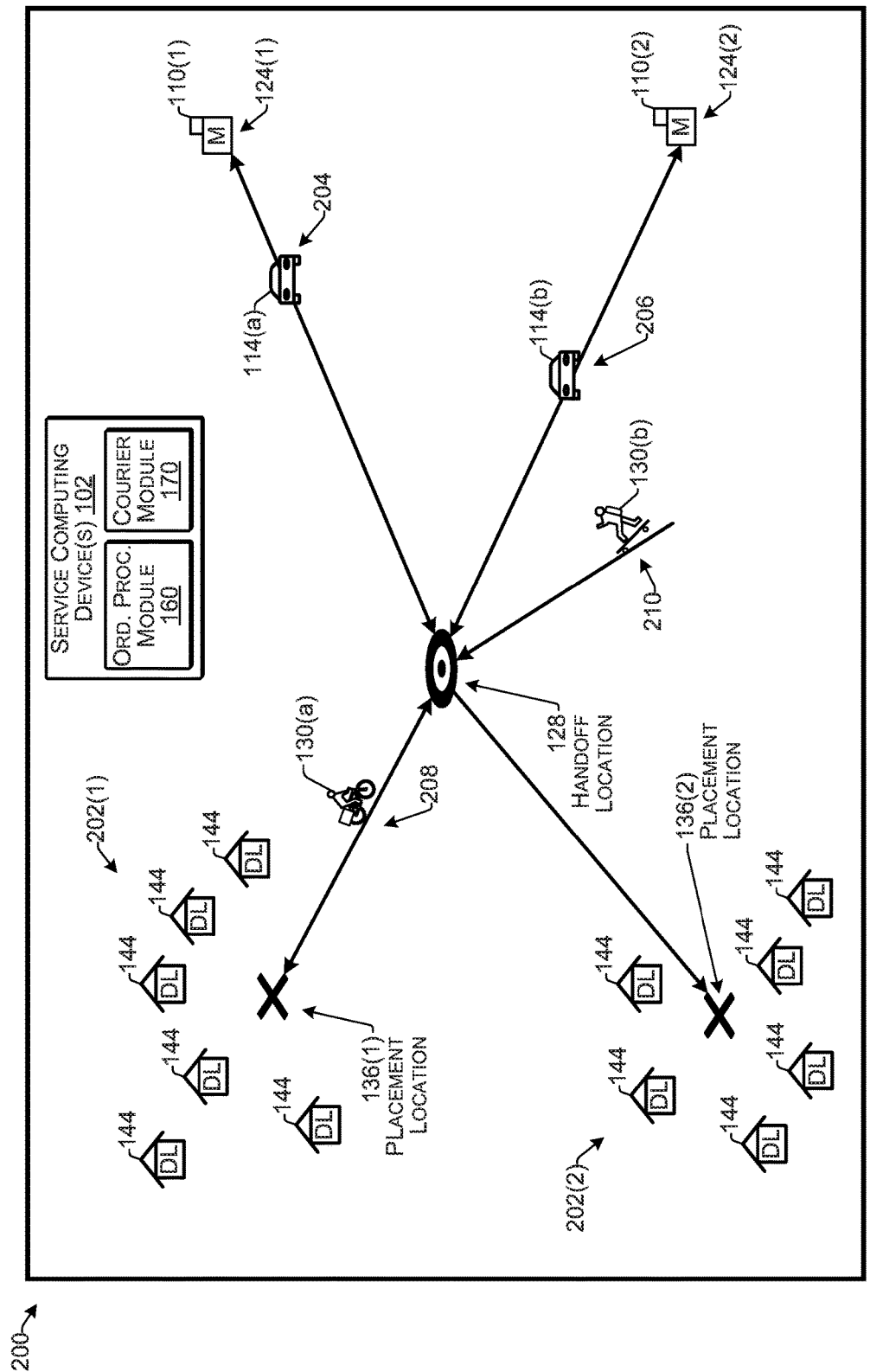
FIG. 2 illustrates an example of determining a handoff location according to some implementations.

FIG. 2 illustrates an example 200 of handing off items to enable fast deliveries according to some implementations. In this example, the courier module 170 may use clustering techniques or various other algorithms to determine buyer location groups of past delivery locations 144 that are clustered sufficiently close together to be a service area 202. For instance, the delivery locations 144 in the service area 202 may be determined to be within a threshold distance of each other so that a courier 130 stationed at a respective service area 202 group may travel between any of the delivery locations 144 included in the buyer location group within a threshold time. Thus, the courier module 170 may ensure that the delivery location 144 of any buyer included in a particular service area 202 is within the threshold distance of the delivery location 144 of any other buyer included in the particular service area 202. In some cases, a courier placement location 136 for a particular service area 202 may be determined based at least in part on determining a centroid of the corresponding buyer location group.

Additionally, or alternatively, application open events may be used to determine courier placement locations 136 for service areas and for determining new service areas. As one example, if a particular buyer is located outside of a current service area 202 when the buyer 138 opens the buyer application, the buyer application may send the buyer's current location to the service computing device 102. The service computing device 102 may store the buyer's current location in association with an "application open event" as a potential delivery location even though there is not an order associated with the buyer's current location. The buyer's current location outside of the service area may be correlated with other application open events received from other buyer devices 156 that are outside the service area and within a threshold distance of one another. If the service computing device 102 receives a sufficient number of application open events in a sufficient density in a region outside of a current service area, the service computing device 102 may identify a cluster of potential delivery locations as a new buyer location group corresponding to a new service area 202, and may dynamically extend the current service coverage to include the cluster of potential delivery locations such as by selecting one or more couriers 114 to provide delivery services to this new service area.

In the illustrated example, suppose that the courier module 170 has determined a first service area 202(1) and a second service area 202(2) based on clusters of delivery locations determined from past order information and/or the application open events discussed above. Furthermore, suppose that the courier module 170 has identified a first recommended courier placement location 136(1) associated with the first service area 202(1), and a second recommended courier placement location 136(2) associated with the second service area 202(2), such as based at least in part on determining the cluster centroid for each respective buyer location group associated with each respective service area 202, or the like.

In addition, based at least in part on the past order information for the delivery locations 144 included in each service area 202, the courier module 170 may determine a recommended inventory for each courier who will service each service area 202. For instance, suppose that in the past, the buyers associated with the first service area 202(1) ordered twice as many burritos as cheeseburgers on any given day, while the buyers associated with the second service area 202(2) ordered approximately the same number of burritos and cheeseburgers on any given day. Consequently, if the service provider is offering burritos and cheeseburgers on the lunch menu today, and if a courier can typically carry 12 items, the courier module 170 may recommend that the courier 130(a) who will be stationed at the first courier placement location 136(1) be given an inventory of 8 burritos and 4 cheeseburgers, while the courier 130(b) who will be stationed at the second courier placement location 136(2) may be given an inventory of 6 burritos and 6 cheeseburgers.

Furthermore, suppose that the order processing module 160 has ordered a plurality of burritos from the first merchant 110(1) and a plurality of cheeseburgers from the second merchant 110(2). Additionally, while two items and two merchants are discussed in this example, in other examples, there may be more merchants and/or more items, or fewer merchants and fewer items. Further, suppose that the courier module 170 has dispatched the courier 114(a) to pick up the burritos from the first pickup location 124(1) associated with the first merchant 110(1), and has dispatched the courier 114(b) to pick up the cheeseburgers from the second pickup location 124(2) associated with the second merchant 110(2). In addition, suppose that the courier module 170 has communicated with the second courier 130(a) for picking up an inventory of burritos and cheeseburgers at the handoff location 128 and going to the first courier placement location 136(1), and has communicated with the second courier 130(b) for picking up an inventory of burritos and cheeseburgers at the handoff location 128 and going to the second courier placement location 136(2). For instance, the courier 130(a) may have already been in the vicinity of the first service area 202(1) while the courier 130(b) may be currently located in a different part of the city.

As discussed above, the courier module 170 may receive location information from each of the courier devices associated with each courier 114, 130 that will participate in the handoff of the burritos and the cheeseburgers. Accordingly, based at least in part on the location information, the courier module 170 may determine an optimal handoff location 128 for the second couriers 130(a), 130(b) to receive the inventories of items from the first couriers 114(a), 114(b). In some examples, the handoff location 128 may be a permanent or temporary handoff location, while in other examples, the handoff location may be determined by the courier module 170 spontaneously, such as based in part on the current locations of the respective couriers. Thus, in the latter example, the courier module 170 may determine the current location 204 of courier 114(a), the current location 206 of courier 114(b), the current location 208 of courier 130(a), and the current location 210 of courier 130(b).

In some cases, the courier module 170 may refer to mapping information, current traffic information, local conditions, and so forth, to determine an optimal handoff location 128 based on a number of factors. For instance, as one simple example, the handoff location 128 may be selected to be a location that is approximately an equal travel time for each of the couriers from their current locations. The courier module 170 may take into consideration the mode of transportation of each of the couriers 114, 130 when determining expected travel times for each of the couriers and/or may refer to historic travel times for each of the couriers 114, 130, such as by referring to the past order information, which may include travel times for each courier 114, 130, such as when making deliveries or when the couriers are otherwise active. Thus, the courier devices may continually provide updated location information to the courier module 170, and in some examples, the courier module 170 may change the handoff location 128 to a new location based on progress or lack of progress of a particular courier.

As another example, the handoff location 128 may be selected based on the location of one or more of the courier placement locations 136(1) and 136(2). For instance, the handoff location 128 may be selected to be a location that is approximately equal travel time between the first courier placement location 136(1) and the second courier placement location 136(2). Furthermore, in the case that there are one or more additional service areas 202 (not shown in FIG. 2), the courier module 170 may take into consideration the locations of the couriers 130 and/or the courier placement locations 136 associated with those additional service areas when determining an optimal handoff location 128. In addition, when selecting a handoff location 128, the courier module 170 may take into consideration factors such as accessibility of the handoff location to the couriers, whether the handoff location is in a public area or on private property, whether the handoff location will cause inconvenience to others, and so forth.

When the couriers 114, 130 arrive at the handoff location 128, the first couriers 114 may handoff the recommended number of items to each of the second couriers 130, such as based on the inventory information received from the courier module 170. When the courier 130(a) has received the recommended inventory, the courier 130(a) may proceed to the first courier placement location 136(1) to await receipt of orders from buyers in the first service area 202(1). Similarly, when the courier 130(b) has received the recommended inventory, the courier 130(b) may proceed to the second courier placement location 136(2) to await receipt of orders from buyers in the second service area 202(2).

Figure 3:
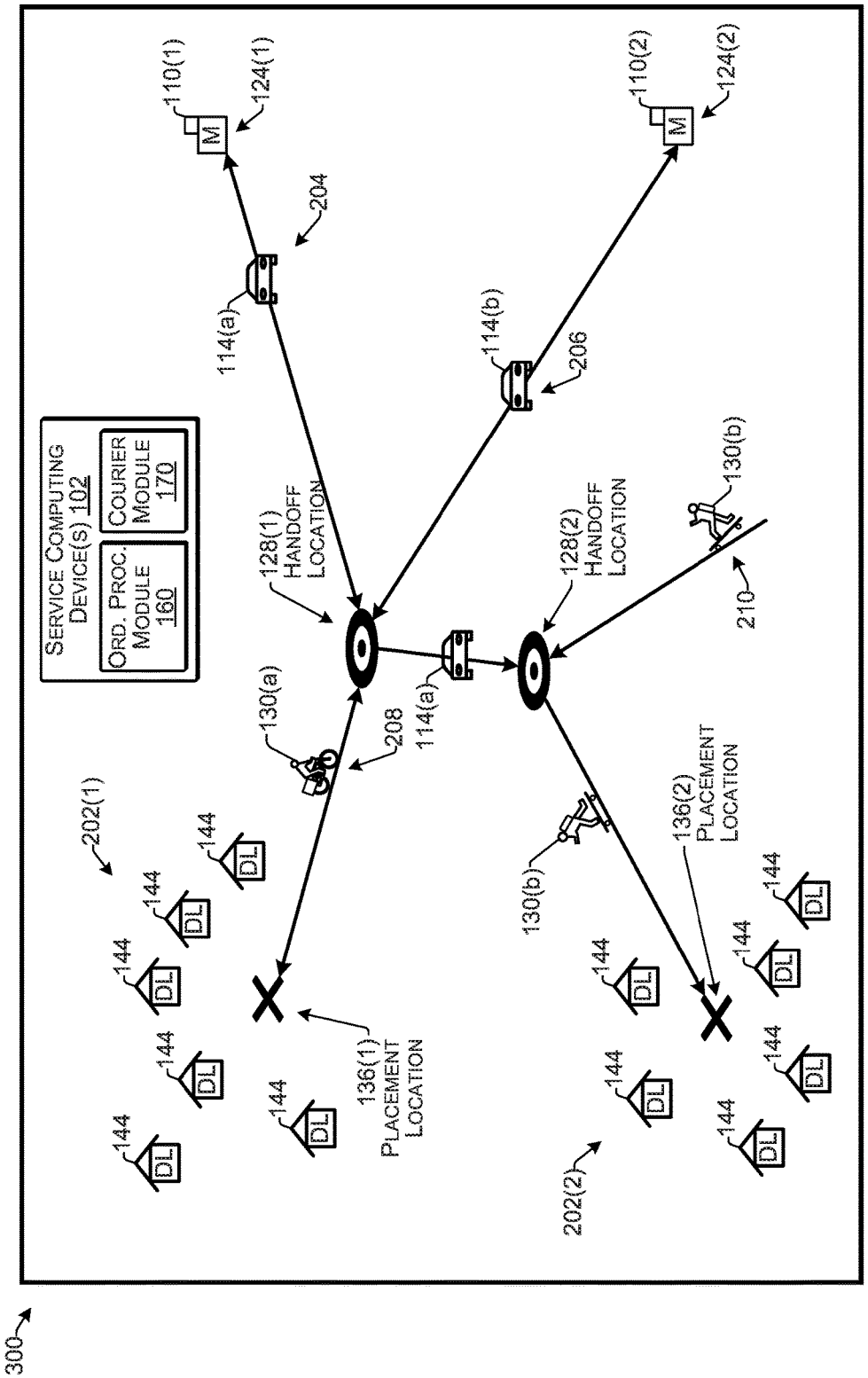
FIG. 3 illustrates an example of determining multiple handoff locations according to some implementations.

FIG. 3 illustrates an example 300 of handing off items to enable fast deliveries according to some implementations. In this example, suppose that a first handoff location 128(1) is determined for the courier 130(a) to receive an inventory of items for delivery to the first service area 202(1) and a second handoff location 128(2) is determined for courier 130(b) to receive an inventory items for delivery to the second service area 202(2). Accordingly, the courier module 170 may select the first handoff location 128(1) based on the current geographic locations of the first couriers 114(a), 114(b), and the second courier 130(a), and further based on the various considerations discussed above, such as based on the courier placement location 136(1). For example, the courier module may determine a location that is suitable for use as a handoff location such as an easily accessible location, e.g. a parking lot, public park, or the like, and that is approximately equal travel time for each of the three couriers 114(a), 114(b), and 130(a) and/or that is near to the placement location 136(1). The three couriers may meet at the first handoff location 128(1) and the courier 130(a) may receive an inventory of items from the courier 114(a) and the courier 114(b).

Next, the courier module 170 may determine the second handoff location 128(2) for handing off an inventory of items to the courier 130(b). For example, courier 114(b) may give some or all of the second items to courier 114(a), and therefore only courier 114(a) has to meet courier 130(b) at the second handoff location 128(2). Alternatively, both couriers 114(a) and 114(b) may travel to the second handoff location 128(2). In either case, the courier module 170 may determine the second handoff location 128(2), such as based on a location that is approximately an equal travel time from the current locations of the couriers 114(a) and 130(b), that is near the placement location 136(2), and/or that is at a suitable location, such as an easily accessible location, or the like. The courier 130(b) may receive the inventory from the courier 114(a) and proceed to the placement location 136(2).

Figure 4:
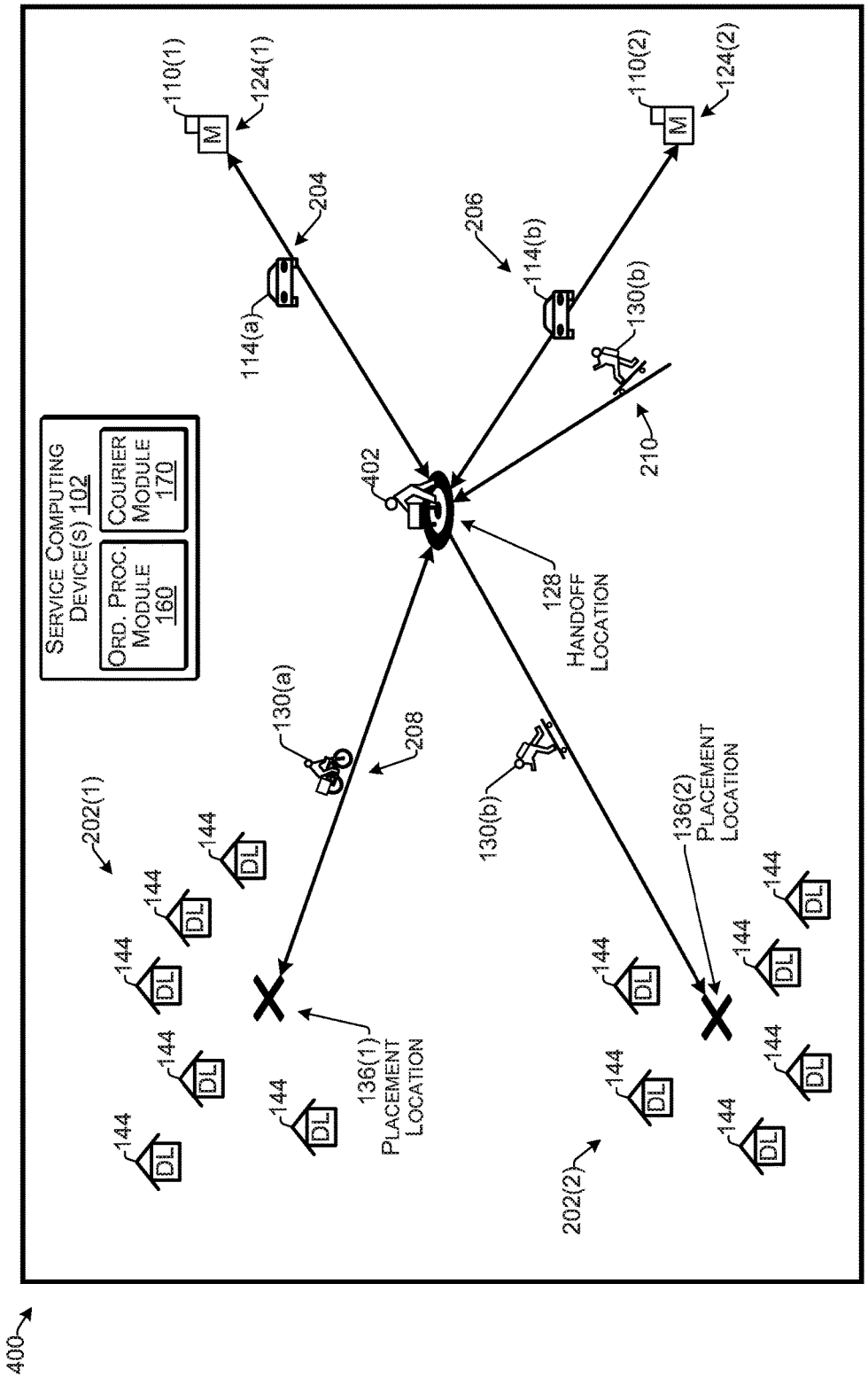
FIG. 4 illustrates an example of determining a handoff location according to some implementations.

FIG. 4 illustrates an example 400 of handing off items to enable fast deliveries according to some implementations. In this example, suppose that a third courier 402 is stationed at the handoff location 128. For instance, the third courier 402 may establish a temporary handoff location or, alternatively, the third courier 402 may be stationed at a permanent handoff location, such as a stand, building, or the like, as enumerated above. In the case that the handoff location 128 is a temporary handoff location that has not yet been determined, the courier module 170 may indicate a recommended handoff location to the third courier 402, such as based in part on the relative locations of the first courier placement location 136(1), the second courier placement location 136(2), the pickup location 124(1) of the first merchant 110(1), and the pickup location 124(2) of the second merchant 110(2). For example, the merchants selected for providing items may change on a daily basis to provide variety to the menu offered by the service.

The third courier 402 may receive the recommended handoff location information and may subsequently use his or her own judgment for determining an optimal location for the handoff location 128, which may be based at least in part on the recommended handoff location. In some examples, the third courier 402 may set up a stand, table, or the like, at the handoff location 128, and may notify the service computing device 102 of the geographic location of the handoff location 128, such as through GPS coordinates provided by a GPS receiver onboard the courier device of the third courier 402, and/or via a street address, or the like. Thus, implementations herein enable dynamic creation of the handoff location 128 and further enable subsequent relocation of the handoff location 128 as needed or desired. For instance, if courier placement location 136(1) and/or 136(2) changes to another location later in the day, and/or the order processing module 160 orders from one or more different merchants later in the day, the third courier 402 may relocate the handoff location 128 to a different location that is more convenient for servicing the couriers 114 and/or couriers 130.

When the order processing module 160 places the order with the first merchant 110(1) for the first items and the second merchant 110(2) the second items, the order processing module 160 may take into consideration the predicted preparation time for each category of item being ordered, and the current locations of the first couriers 114(a) and 114(b). In addition, the courier module 170 may predict the arrival time of the first couriers 114(a) and 114(b) at the handoff location 128. For instance, the courier module 170 may consider current traffic conditions or other local conditions, as well as historic travel times of each courier. Based at least in part on the predicted arrival times of the first couriers 114(a) and 114(b), the courier module 170 may provide instructions to the second couriers 130(a) and 130(b) to time the arrival of the second couriers 130(a) and 130(b) at the handoff location 128 at approximately the same time or shortly after the arrival of the first couriers 114.

Furthermore, the third courier 402 may receive information about the recommended inventories of the second couriers 130(a) and 130(b). When the first couriers 114(a) and 114(b) arrive at the handoff location 128, the third courier 402 may check in or otherwise receive the items from the first couriers 114(a) and 114(b), and may proceed to divide up the items into the recommended inventories for the second couriers 130(a) and 130(b), as well as any additional second couriers (not shown in FIG. 4) that may be picking up items at the handoff location 128. When the second couriers 130(a) and 130(b) arrive at the handoff location, the third courier 402 may check out or otherwise provide the recommended inventories to the respective second couriers 130(a) and 130(b).

In addition, implementations herein may enable timing to ensure freshness of the items being delivered to the buyers by enabling staggering of item preparation by the merchants 110, staggering of first courier pickups, and staggering of second courier pickups. For example, the order processing module 160 may place orders for first sets of items from a plurality of merchants 110 and the first couriers 114 may pick up the items and deliver the items to a handoff location 128 where a plurality of second couriers 130 may receive the items and take the items to service areas 202 for delivery. While this is taking place, the order processing module 160 may place orders for second sets of items from the merchants 110, and the first couriers 114 may go pick up the items and return to the same handoff location or another handoff location where another plurality of second couriers 130 may receive the items and take the items to service areas 202 for delivery. Accordingly, fresh items may be continually arriving at service areas 202. In addition, the order processing module 160 is able to determine real-time inventory information for each second courier 130, and can adjust the number of each category of item ordered in subsequent orders based on knowledge of how many of each category of item remain unsold in current courier inventories.

Figure 5:
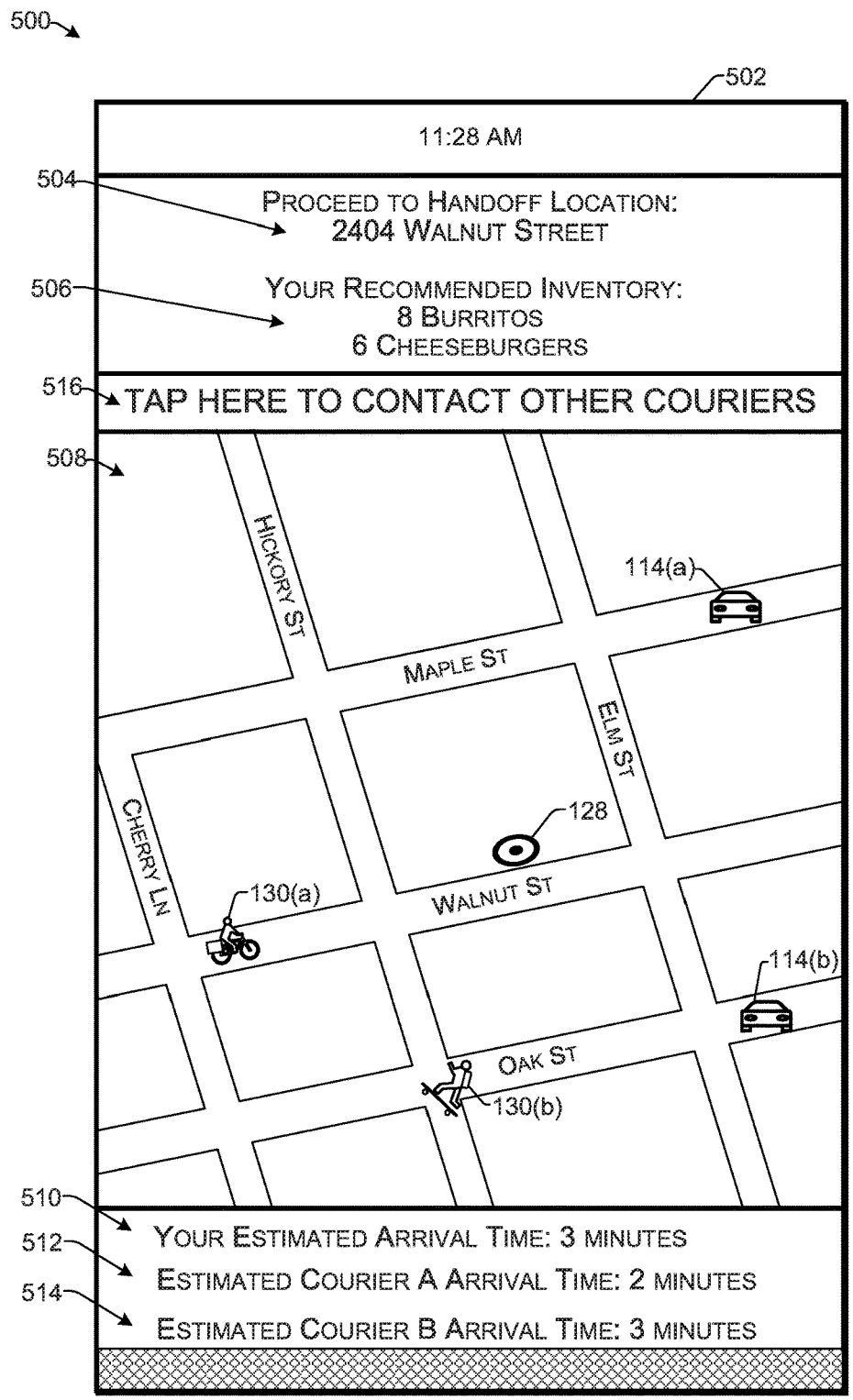
FIG. 5 illustrates an example graphic user interface for presentation on a courier device according to some implementations.

FIG. 5 illustrates an example graphic user interface (GUI) 500 for presenting handoff information on a display 502 associated with the courier device 150 of a courier according to some implementations. In this example, suppose that the GUI 500 is presented on the courier device 150 of the courier 130(a), such as for instructing the courier 130(a) of the location of the handoff location 128 for picking up an inventory of items. The GUI 500 may present a street address 504 of the handoff location 128 to which the couriers 114(a), 114(b), 130(a), and 130(b) are traveling. In addition, the GUI 500 may further present inventory information 506, which may include a recommended inventory for the particular courier 130(a) indicating how many of each category of items the courier 130(a) is to receive.

The GUI 500 may further include a map 508 that shows the current locations of each of the couriers 114(a), 114(b), 130(a) and 130(b) that are participating in the handoff transaction at the indicated handoff location 128. For example, the map 508 may be updated in real time as the locations of each of the couriers 114(*a*), 114(*b*), 130(*a*), and 130(*b*) changes. As mentioned above, each instance of each courier application associated with each courier device of each courier may periodically transmit location information to the service computing device, such as based on information obtained by a GPS receiver associated with each courier device, or through other location sensors. Accordingly, the service computing device may send mapping information to each of the couriers participating in the handoff transaction to enable presentation of the map 508.

As another example, rather than the service computing device specifying the handoff location 128, the couriers may use the map 508 to view the current location of the other couriers. As the couriers 114(*a*), 114(*b*), 130(*a*) and 130(*b*) become proximate to each other, one of the couriers 114(*a*), 114(*b*), 130(*a*) and 130(*b*) may select the handoff location 128 based on finding a suitable handoff location nearby, such as a parking lot, public park, or the like, as enumerated elsewhere herein. Based on one of the couriers specifying the handoff location 128, the specified handoff location 128 may be sent to the courier devices of the other couriers and presented on the map 508 on the courier devices of the other couriers. The other couriers may then travel to the handoff location 128 specified by the particular courier.

The GUI 500 may further include a textual indication 510 of the predicted arrival time of courier 130(*a*) at the handoff location 128, a textual indication 512 of the predicted arrival time of the first courier 114(*a*) at the handoff location 128, and a textual indication 514 of the predicted arrival time of the first courier 114(*b*) at the handoff location 128. In addition, the courier may be able to scroll down to view the predicted arrival times of other couriers participating in the handoff transaction, such as the predicted arrival time of the second courier 130(*b*) at the handoff location 128. Furthermore, the GUI 500 may include a virtual control area 516 that the courier may tap on or otherwise select for contacting the other couriers 114(*a*) and 114(*b*), such as if the courier 130(*a*) is delayed, cannot find the handoff location 128, or the like.

After the courier 130(*a*) has picked up the inventory of items at the handoff location 128, the GUI 500 may present the recommended courier placement location 136(1) on the map 508 (not shown in FIG. 5). Accordingly, the courier 130(*a*) may subsequently use the GUI 500 for navigating to the recommended courier placement location 136(1) to await the receipt of orders from buyers in the service area 202(1) discussed above with respect to FIGS. 2-4.

Figure 6:
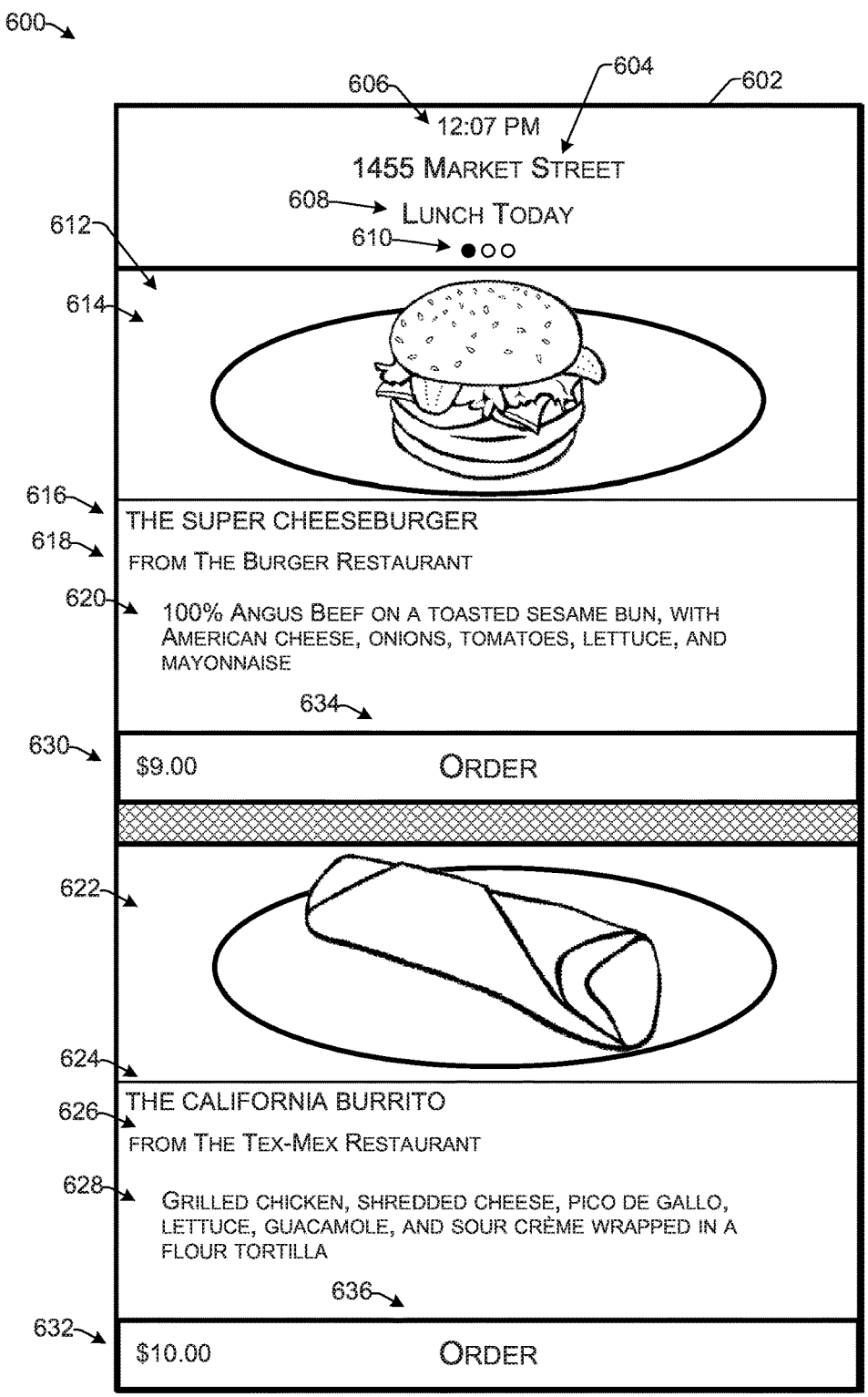
FIG. 6 illustrates an example graphic user interface for presentation on a buyer device according to some implementations.

FIG. 6 illustrates an example graphic user interface (GUI) 600 for presenting item information on a display 602 associated with the buyer device 156 according to some implementations. The GUI 600 presents information about one or more items that may be selected for delivery to enable a buyer to use the buyer device 156 to place an order for one or more of the items. The GUI 600 includes an indicated delivery location 604, such as an address to which the buyer's order is to be delivered. In some examples, the delivery location 604 may be determined by the buyer application based on a current location of the buyer device 156, as indicated, e.g., by one or more location sensors included in the buyer device 156. For example, the current location may be determined from GPS information provided by an onboard GPS receiver, and/or from wireless access point information, cell tower information, or the like, determined through one or more communication interfaces, and/or through various other techniques.

In some examples, the delivery location 604 may be entered manually by the buyer, may have been previously used by the buyer, and/or may be a default location that may be changed by the buyer through interaction of the buyer with the GUI 600. As mentioned above, in some examples, the items available for delivery may change based on the indicated delivery location 604, e.g., based on inventories of nearby couriers. Accordingly, the buyer application may determine the indicated delivery location 604 prior to presentation of the item information.

The GUI 600 further includes a current time 606, and an indication 608 that the user is ordering for a current delivery period, which is lunch time in this example. Further, the GUI 600 includes an indicator 610, which indicates that the user may swipe the screen to view items expected to be available at other delivery periods, such as dinner time or lunch tomorrow. In some cases, various different items obtained from different merchants may be available based on the time of day and day of the week.

In the illustrated example, the GUI 600 presents item information 612 about two items. In some cases, the couriers herein may typically have several categories of items in inventory. The item information 612 includes a representative image 614 and a name 616 of a first item, e.g., "The Super Cheeseburger". The item information for the first item may further indicate the merchant name 618, e.g., "The Burger Restaurant", and a description 620 of the first item. In addition, the item information for the second item may include a representative image 622, and a name 624 of the second item, e.g., "The California Burrito". The item information for the second item may further include the merchant name 626, e.g., "The Tex-Mex Restaurant", and a description 628 of the second item. Further, while information about two items is presented in this example, information about other items, if currently available for delivery, may be presented in the GUI 600 by the buyer scrolling or otherwise traversing through the item information.

In the GUI 600 of this example, the current time 606 is indicated to be 12:07 PM. By default, the buyer application may be configured to assume that the buyer wishes to order an item for delivery as soon as possible, rather than at some point later in the day or the next day. Accordingly, based on this assumption, the GUI 600 may default to presenting item availability based on the buyer wanting to order now and have delivery within, e.g., 15 minutes. In some examples, if the buyer alternatively wishes to have the order delivered at a later time, the buyer may be presented with an option for specifying a later delivery time.

Based on the assumption that the buyer would like to order an item now, the buyer application may receive and present item information for the current time period. Thus, the user interface 600 may present the item information based on the current inventory of one or more couriers within a threshold delivery travel time of the indicated delivery location 604 of the buyer. For instance, as mentioned above, the order processing module may determine couriers within a threshold delivery travel time of the delivery location 604, determine the current inventories of those couriers, and may send item information to the buyer based on the current inventories. In some examples, the threshold delivery travel time may be based on the ability of a courier to arrive at the delivery location 604 within a threshold time such as 15 minutes or less. The travel time may be determined based on the distance between the courier location and the delivery location and, in some cases, further based on the type of vehicle that the courier is using, current traffic condition, and so forth. Accordingly, in some examples, the threshold distance may change somewhat depending on current traffic conditions, an area of a city in which the delivery location is located, and so forth, but the threshold delivery travel time may be constant.

The GUI 600 may further include a price 630 for the first item and a price 632 for the second item. For instance, the buyer may tap on or otherwise select a first area 634 of the GUI 600 to order the first item, or the buyer may tap on or otherwise select a second area 636 of the GUI 600 to order the second item. Accordingly, the areas 634 and 636 may serve as virtual controls to enable the buyer to select one of the items for delivery. In some examples, a delivery fee may be included in the prices 630 and 632 of the items presented in the GUI 600, while in other examples, a separate delivery fee may be added to a total presented in subsequent user interface presented to the buyer following selection of one of the virtual controls 634 or 636. Further, the GUI 600 is just one example of a possible GUI for presenting item information according to some implementations herein. Numerous other variations will be apparent to those of skill in the art having the benefit of the disclosure herein.

Figure 7:
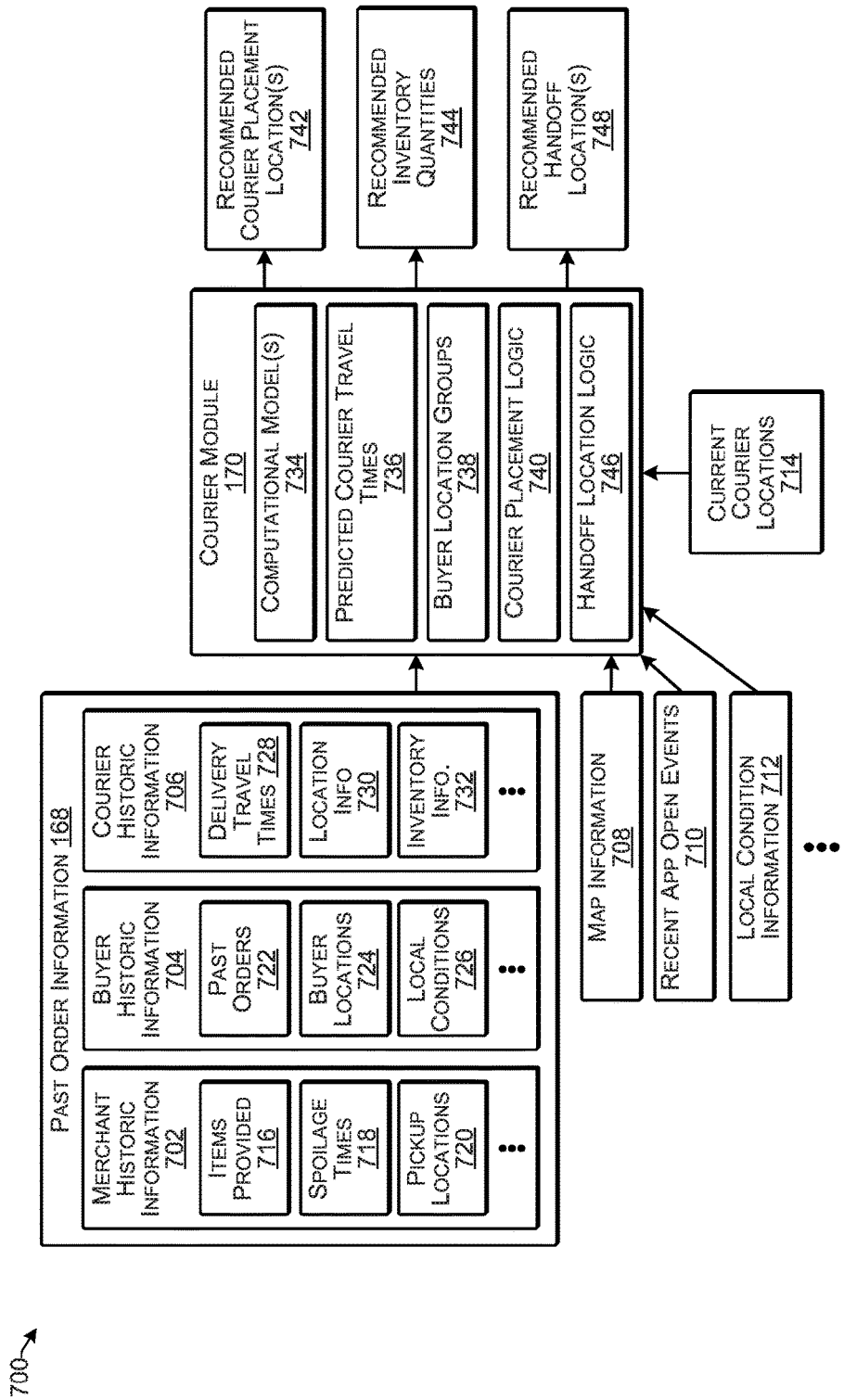
FIG. 7 is a block diagram illustrating an example framework for determining handoff locations, courier placement locations, and/or courier inventories according to some implementations.

FIG. 7 is a block diagram illustrating an example framework 700 for determining courier placement according to some implementations. In this example, the courier module 170 may receive the past order information 168 including merchant historic information 702, buyer historic information 704, and courier historic information 706. In addition, the courier module 170 may receive map information 708, recent application open events 710, local condition information 712, and/or current courier location information 714. Further, while several types of information that may be used by the courier module 170 are illustrated, in other examples, other or additional types of information may be used by the courier module 170, as discussed herein and/or as will be apparent to those of skill in the art having the benefit of the disclosure herein.

The merchant historic information 702 includes historic order information related to the merchants, e.g., various types of information related to the merchants that participate in the service of the service provider 104. For instance, the merchant historic information 702 may include items provided 716 by each merchant at particular times on particular days of the week, particular dates, and the like. Further, the merchant historic information 702 may include spoilage times 718 for the items provided by each merchant and the pickup locations 720 associated with each merchant. For example, if a threshold quantity of spoilage complaints are received for a particular item, the threshold spoilage time 718 for that item may be decreased. Alternatively, if spoilage complaints are not received for an item, the spoilage time 718 for that item may be gradually increased.

Additionally, the buyer historic information 704 includes historic order information related to the buyers. Examples of buyer historic information 704 may include past orders 722, e.g., a time of day, day of the week, and date on which each order was placed, item ordered, amount paid, and so forth. The buyer historic information 704 may further include buyer locations 724, including delivery locations to which each order was delivered, and locations of the buyer devices during application open events in which the application was opened, but an order was not placed because the buyer was outside a current service area and/or no courier was within the threshold distance. Additionally, the buyer historic information 704 may include local conditions 726 that may have been in effect when the orders were received. For example, there may be more orders placed during certain weather conditions, such as during rain, during high heat, etc., or during certain local events, festivals, or the like.

Further, the courier historic information 706 includes historic order information related to the couriers. For example, the courier historic information 706 may include courier delivery travel times 728, which may indicate the time that an order was assigned and the time that the order was delivered, e.g., how long it took each courier to arrive at the delivery location and drop off the item after being assigned an order. Additionally, courier location information 730 may include locations of individual couriers at different times of day, for different days of the week, and in different parts of the service region. For instance, the courier location information 730 may indicate how long it took each courier to travel known distances, such as from the location at which the order was assigned to the delivery location. Thus, the courier module 170 may predict courier travel times based on a conversion factor determined from the courier location information. For example, the courier location information 730 may indicate that, on average, couriers on bicycles are able to travel about a mile in three minutes and about five miles in 15 minutes. Consequently, a threshold delivery travel time of 15 minutes, may correspond to a threshold distance that may be five miles or less for bicycle couriers.

In addition, the courier historic information 706 may include inventory information 732, such as how many items a particular courier picked up and how long it took the courier to unload the entire inventory of items. Furthermore, the merchant historic information 702, the buyer historic information 704, and the courier historic information 706 may include additional types of information, with the foregoing being merely several examples of the types of information that may be used by the courier module 170.

In some examples, the courier module 170 may employ one or more computational models 734 to determine predicted courier travel times 736 between locations, such as between a courier location and a buyer location or between two buyer locations 724. As one example, the predicted courier travel times 736 may be used for determining buyer location groups 738, which may in turn indicate recommended service areas, as discussed above with respect to FIGS. 2-4. For instance, the courier module 170 may determine clusters of buyer locations as the buyer location groups 738 from which orders are likely to be received, and in which the buyer locations are clustered sufficiently close together so that a courier stationed at the service area may fulfil orders within the threshold time. The courier module 170 may further employ courier placement logic 740 for determining recommended courier placement locations 742 at which couriers may be stationed to wait for orders to be received.

As one example, the buyer location groups 738 may be determined based on clusters of past delivery locations. As another example, a new buyer location group 738 may be determined based on a plurality of application open events at respective locations in an area not currently an established service area. Furthermore, in some examples, the buyer location groups 738 may be determined according to different items 716 offered, different local conditions 712, different times of day, different days of the week, and the like. For example, on a particular day, if couriers will have burritos in their inventory, the buyer location groups 738 may be calculated just based on buyer locations 724 corresponding to past orders 722 for burritos, rather than for all past orders. Consequently, the recommended courier locations 742 may change dynamically day to day depending on the particular item being offered by the couriers on the particular day.

In some examples, when determining buyer location groups 738, a plurality of buyer locations 724 may be provided to the one or more computational models 734, such as in the form of longitude and latitude GPS coordinates. The computational model 734 may determine clusters of the buyer locations, such as based on any suitable clustering algorithm, e.g., density-based clustering, centroid-based clustering, or the like. As one example, a clustering algorithm, such as the k-means algorithm, may be used to determine clusters of delivery locations or application open event locations based at least in part on determining distances between the respective delivery locations or the respective application open locations. The determined distances may be converted to predicted courier travel times 736, e.g., based on the conversion factor discussed above, e.g., for bicycle couriers a mile may be converted to 3 minutes, or other number, based on average travel times determined from the delivery travel times 728 and/or the courier location information 730. Furthermore, in some cases, the predicted delivery travel times 736 may include an average drop off time that is added in, e.g., an amount of time after the courier arrives at the delivery location for the courier to knock on the door and provide the item to the buyer.

As one example, when identifying buyer locations to include in a buyer location group 738, the maximum predicted courier travel time 736 between any two locations included in the group 738 may be approximately equal to the threshold delivery travel time. Thus, a courier may be stationed close to the center of group 738 and may be able to reach any predicted delivery location in the buyer location group 738 within the threshold delivery travel time and also subsequently reach a delivery location on the other side of the group within the threshold time. Additionally, in some examples, map information 708, traffic information or other local condition information 712, such as may be obtained from an online map service, e.g., via a webserver or other network source, may also be taken into consideration in combination with the output of the computational model when determining the predicted courier travel times 736. Further, the courier module 170 may adjust the technique for determining the predicted courier travel times 736 based on received courier location information 730. For example, if the actual courier travel time is different from that predicted by the computational model 734, the courier module 170 may adjust the conversion factor or other logic used to determine the predicted courier travel times 736 so that the predicted times are more accurate.

As mentioned above, the courier location information sent from the courier devices to the service computing device may be used to determine the current courier locations 714. In some examples, the courier application may automatically send courier location information to the courier module 170 on a periodic basis while the associated courier is on-duty or otherwise active. Alternatively, the courier module 170 may periodically ping the courier devices of active couriers to determine the couriers' current locations. Each courier device may include one or more location sensors, such as a GPS receiver, and/or communication interfaces that can determine (e.g., from cell towers or wireless access points) a geographic location of the courier device. Thus, the courier module 170 may continually receive courier location information from the courier device, such as every 10 seconds, every 30 seconds, every minute, every 2 minutes etc., and may continually update the courier location with respect to map information 708.

Additionally, or alternatively, the courier application may send location information whenever acceleration of the courier device exceeds a threshold level, or the like, which may indicate starting, stopping, or other movement by the courier. Accordingly, the courier module 170 may continuously track the courier's location, such as for determining initial movement toward the delivery location following assignment of a delivery job, arrival at the delivery location, and departure from the delivery location. Based on this location information provided by the courier devices, the courier module 170 may determine courier travel times for comparison with the predicted courier travel times 736.

The courier placement logic 740 may include one or more algorithms, one or more computational models, a plurality of decision-making rules, or the like, configured to determine, based on the buyer location clusters, locations at which to station couriers, how many couriers to station at each location, how many items to recommend that each courier include in his or her initial inventory, and so forth. For instance, the courier placement logic 740 may employ the various different considerations discussed above to determine the recommended courier placement locations 742 based on the buyer location groups 738, the number of potential orders predicted for each group, the density of each group, and so forth. As one example, the courier placement logic may determine a centroid of a cluster corresponding to a buyer location group 738, and may recommend that a courier be stationed at or near the centroid (e.g., within a several minutes travel time). In addition, based on how quickly couriers have delivered their entire inventories in the past when stationed at various different locations, and based on the item spoilage times 718 for particular items, the courier placement logic 740 may recommend an initial inventory quantity 744 of items for the couriers to pick up for their inventories. Additionally, the mix of item categories in the inventory may be based on past sale of items in the particular service area or in a plurality of service areas.

Further, as mentioned above, the courier placement logic 740 may dynamically establish a new service area based on identifying a cluster of application open events that took place at buyer locations outside an established service area, and that exceeded a threshold number of events detected over a threshold period of time. Thus, based at least in part on location information received from a plurality of buyer devices, e.g., as determined by the GPS receivers of the respective buyer devices, the service herein is able to identify new service areas to which to expand the service, even though the service may not have previously made any deliveries or other sales of the items in the new service area.

In addition, the courier module 170 may include handoff location logic 746 that may determine one or more recommended handoff locations 748. For instance, the one or more computational models 734 may be used by the handoff location logic 746 when determining a recommended handoff location 748 on the fly for a plurality of couriers. For instance, the handoff location logic 746 may determine a handoff location 748 based on current courier locations 714 and predicted courier travel times 736 for each courier participating in a handoff transaction. Further, the handoff location logic 746 determine suitability of handoff locations, such as by recommending a handoff location that is closer to a road that other couriers can use for accessing the handoff location, rather than merely recommending a geographic location based on a centroid, or the like. As one example, the handoff location logic 746 may select a handoff location 748 based on an approximate meeting location that the couriers participating in the handoff are predicted to arrive at if they travel toward each other based on current locations and current travel times. As another example, the handoff location may be determined based on courier placement locations of the couriers participating in the handoff. For instance, the handoff location logic 746 may determine a handoff location 748 that is based on a centroid or other central location of a plurality of courier placement locations 742 associated with couriers participating in the handoff. As an example, suppose there are six service areas, each having an associated courier placement location. In some examples, the service areas may overlap with one or more other service areas. A centroid location may be determined for the six courier placement locations that is approximately an equal distance to each of the six courier placement locations (e.g., give or take several minutes of courier travel time). Thus, this centroid location may be used as the handoff location for couriers picking up inventories for the six service areas. Accordingly, the handoff location determining logic 746 may employ any of several different techniques for determining recommended handoff locations 748.

Additionally, while the computational models 734 have been described as one example of a technique for determining predicted courier travel times 736, buyer location groups 738, recommended courier placement locations, recommended inventory quantities 744, and/or recommended handoff locations 748, numerous other techniques, algorithms, decision-making rules, and the like, may additionally, or alternatively, be used for determining this information. Accordingly, implementations herein are not limited to use of computational models 734.

Figure 8:
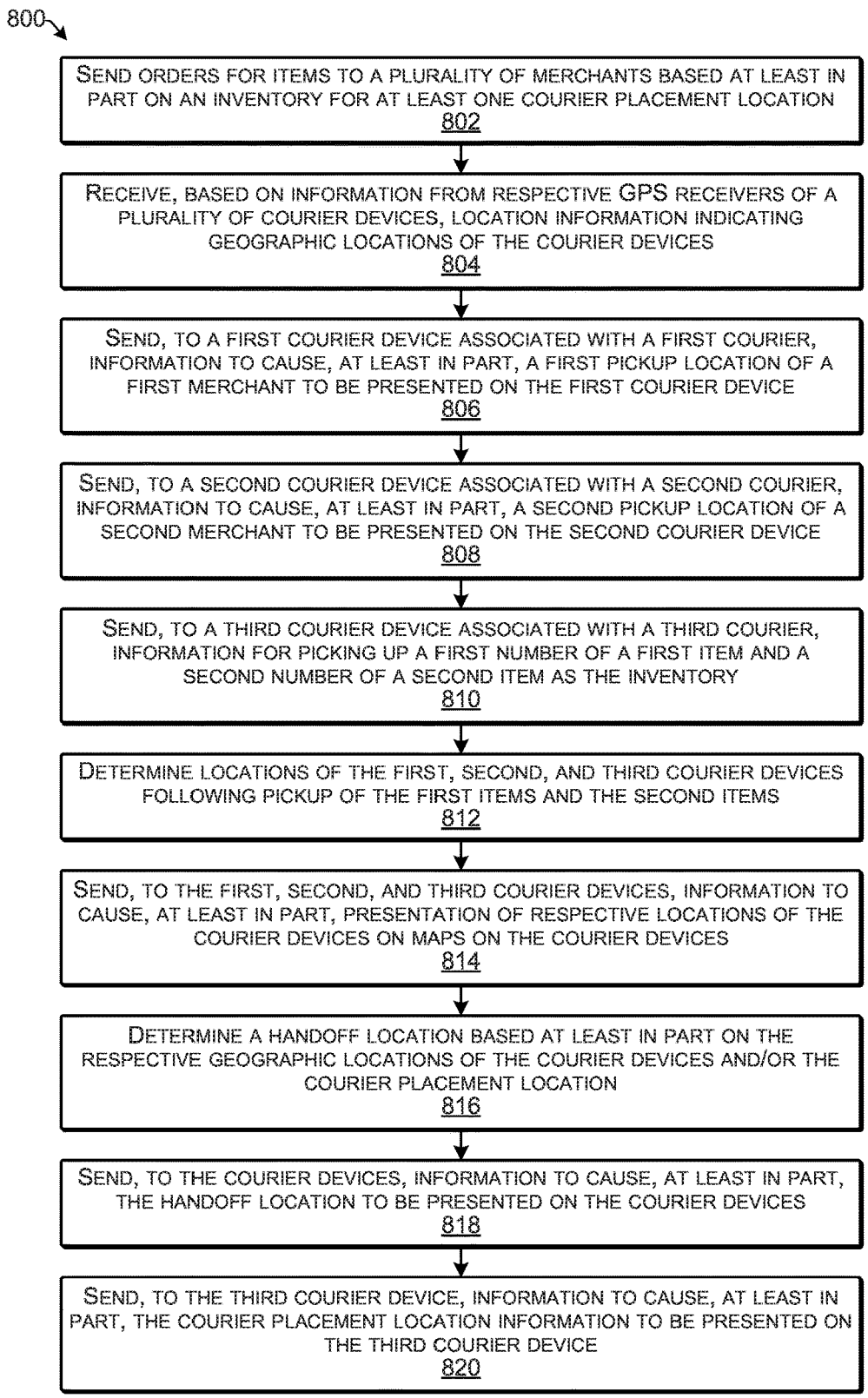
FIG. 8 is a flow diagram illustrating an example process for communications to effect handoffs and courier placements according to some implementations.
Figure 9:
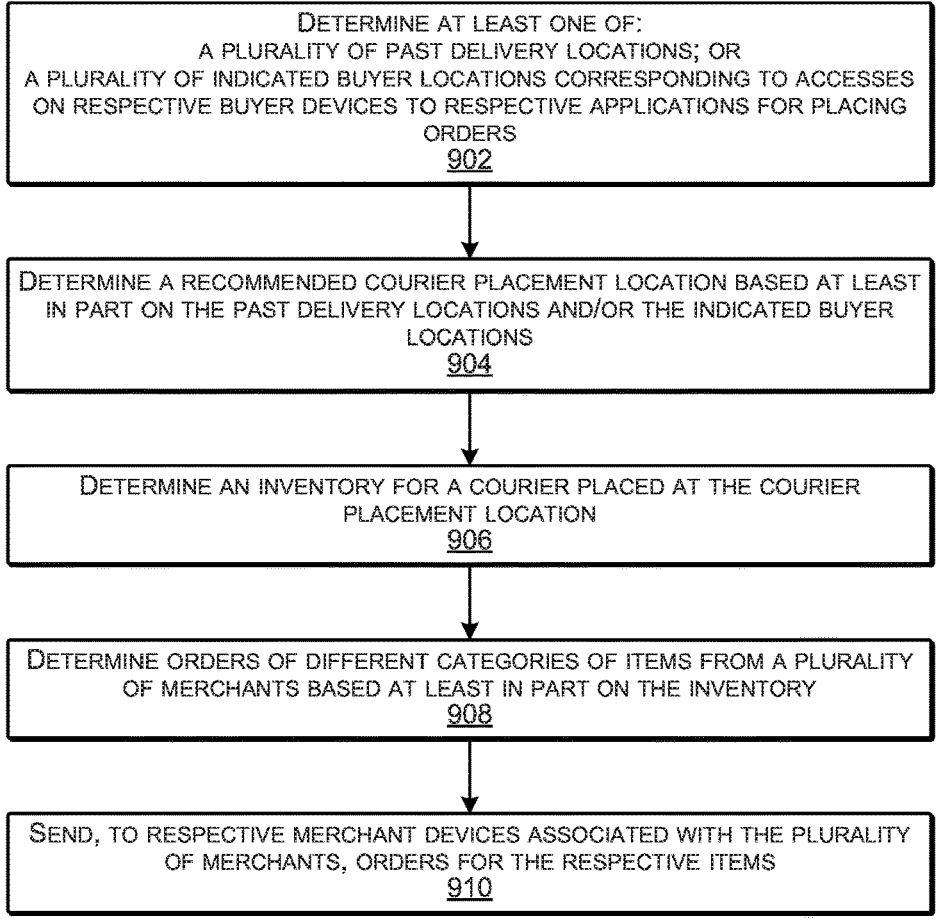
FIG. 9 is a flow diagram illustrating an example process for determining courier placements, inventories, and/or merchant orders according to some implementations.

FIGS. 8 and 9 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 8 is a flow diagram illustrating an example process 800 for handing off items according to some implementations. In some examples, the process may be executed at least in part by the service computing device 102 or other suitable computing device.

At 802, the computing device may send orders for items to a plurality of merchants based at least in part on an inventory determined for at least one courier placement location. Example techniques for determining the courier placement location and the associated inventory are discussed above, and are further discussed below with respect to FIG. 9.

At 804, the computing device may receive, based on information from respective GPS receivers of a plurality of courier devices, location information indicating geographic locations of the courier devices. For example, the location information may be received on a periodic basis from each courier device of each active courier.

At 806, the computing device may send, to a first courier device associated with a first courier, information to cause, at least in part, a first pickup location of a first merchant to be presented on the first courier device. For instance, when the courier application is active on the courier device, the application may present received location information related to a first merchant pickup location to which the first courier is to travel to pickup ordered items. As one example, the courier application may present a map showing the pickup location.

At 808, the computing device may send, to a second courier device associated with a second courier, information to cause, at least in part, a second pickup location of a second merchant to be presented on the second courier device. For instance, when the courier application is active on the courier device, the application may present received location information related to a second merchant pickup location to which the second courier is to travel to pickup ordered items. As one example, the courier application may present a map showing the pickup location.

At 810, the computing device may send, to a third courier device associated with a third courier, information for picking up a first number of a first item and a second number of a second item as the inventory. The third courier may receive inventory information about an inventory that the third courier is to pick up from a handoff location. In some cases, the third courier may be instructed to begin traveling toward an anticipated handoff location, such as in the cases that the handoff location is already established.

At 812, the computing device may determine locations of the first, second, and third courier devices following pickup of the first items and the second items. For instance, the relative locations may be determined based on the received location information.

At 814, the computing device may send, to the first, second, and third courier devices, information to cause, at least in part, presentation of respective locations of the courier devices on maps on the courier devices. For example, the courier applications on each courier device may present a map showing the relative locations of each courier based in response to receipt of the information.

At 816, the computing device may determine a handoff location based at least in part on the geographic location of at least one courier device and/or the based at least in part on the courier placement location. In some cases, the handoff location may be based on the current locations of the couriers and the predicted courier travel times. In addition, or alternatively, the courier placement location may also be considered for determining a handoff location. In some cases, there may be multiple courier placement locations and the handoff location may be determined based at least in part on a centroid location determined from the multiple courier placement locations.

At 818, the computing device may send, to the courier devices, information to cause, at least in part, the handoff location to be presented on the courier devices. Thus, the courier application on each courier device may present the handoff location in response to receiving the information from the computing device.

At 820, the computing device may send, to the third courier device, information to cause, at least in part, the courier placement location information to be presented on the third courier device. For example, the third courier may send confirmation that the inventory has been received, and, in response, the third courier device may receive courier placement information to cause presentation of map showing the courier placement location for the first courier.

Alternatively, if an order from the corresponding area has already been received, the map may present a delivery location of the buyer.

FIG. 9 is a flow diagram illustrating an example process 900 for determining courier placement locations, courier inventories and/or merchant orders according to some implementations. In some examples, the process may be executed, at least in part, by the service computing device 102 or by another suitable computing device. Some or all of the process 900 may be combined with the process 800 in some examples.

At 902, the computing device may determine at least one of: a plurality of past delivery locations; or a plurality of indicated buyer locations corresponding to accesses on respective buyer devices to respective applications for placing orders. For example, the computing device may access past order information to determine cluster of past order locations within the threshold distance of each other. Additionally, or alternatively, the computing device may refer to buyer locations associated with received application open events for determining a cluster of buyer locations within the threshold distance of each other.

At 904, the computing device may determine a recommended courier placement location based at least in part on the past delivery locations and/or the indicated buyer locations. For instance, the computing device may determine a centroid of the cluster(s) discussed above, and may determine the courier placement location based at least in part on the centroid.

At 906, the computing device may determine an inventory for a courier placed at the courier placement location. For example, the computing device may determine an inventory for the service area based on past order information for the particular service area or a plurality of service areas.

At 908, the computing device may determine orders of different categories of items from a plurality of merchants based at least in part on the inventory. The computing device may determine a plurality of inventories for a plurality of courier placement locations, and may determine orders to send to the merchants by adding together all the items for all the inventories.

At 910, the computing device may send, to respective merchant devices associated with the plurality of merchants, orders for the respective items.

Figure 10:
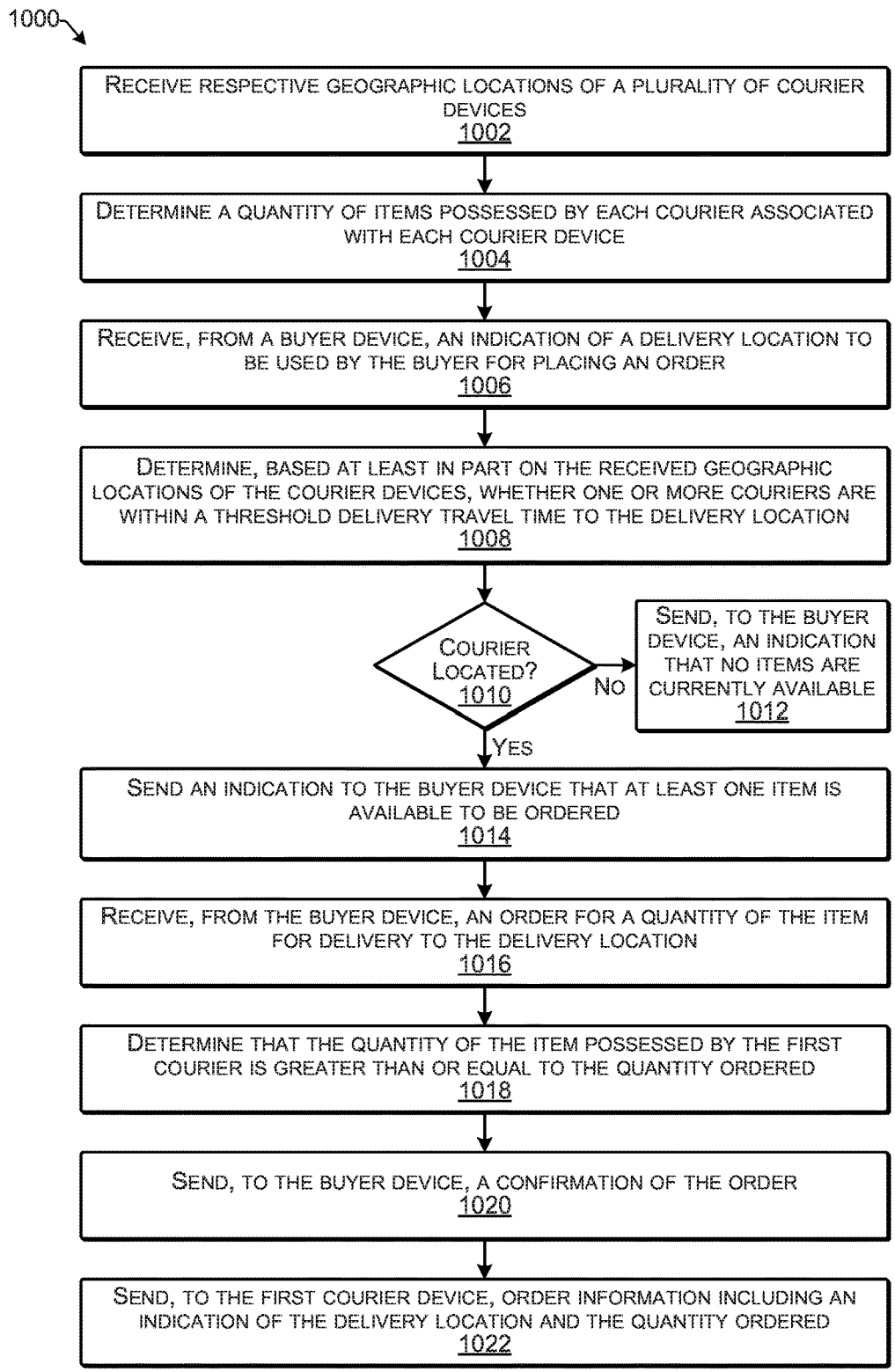
FIG. 10 is a flow diagram illustrating an example process for determining item information to send to a buyer device for fast delivery according to some implementations.

FIG. 10 is a flow diagram illustrating an example process 1000 for determining proximate couriers and associated item information for fast deliveries to a buyer according to some implementations. In some examples, the process may be executed in part by the service computing device 102 or by another suitable computing device, and in part by the courier devices 150 and the buyer devices 156.

At 1002, the computing device may receive respective geographic locations of a plurality of courier devices. For example, a plurality of courier devices associated with a plurality of couriers may send respective electronic communications indicating respective locations of the courier devices based at least in part on respective geographic locations of the courier devices determined through information from respective courier device GPS receivers.

At 1004, the computing device may determine a quantity of items possessed by each courier associated with each courier device. For example, the computing device may keep a record of the inventory of each courier. Additionally or alternatively, the courier application on each courier device may periodically send information regarding the inventory of each courier to the service computing device.

At 1006, the computing device may receive, from a buyer device, an indication of a delivery location to be used by the buyer for placing an order. For instance, as mentioned above, the delivery location may be based on GPS information determined by the buyer device, or the delivery location may be entered manually by the buyer.

At 1008, the computing device may determine, based at least in part on the received geographic locations of the courier devices, one or more couriers within a threshold delivery travel time to the delivery location. For instance, the computing device may determine predicted courier travel times based on the location of each of the couriers to the delivery location indicated by the buyer. As one example, the predicted courier travel times may be determined based on the distance between the couriers' current locations and the indicated delivery location, and a conversion factor may be used for determining the predicted courier travel times.

At 1010, the computing device may determine whether any couriers have been located that are within the threshold delivery travel time to the delivery location.

At 1012, if no couriers are located, the computing device may send, to the buyer device, an indication that no items are currently available. Accordingly, the application on the buyer device may present a notification that there are no items currently available for delivery to the buyer at the indicated delivery location.

At 1014, on the other hand, if at least one courier is located, the computing device may send an indication to the buyer device that at least one item is available to be ordered. For example, the computing device may send item information to the buyer device corresponding to the inventory of the at least one courier that is within the threshold travel distance to the delivery location indicated by the buyer.

At 1016, the computing device may receive, from the buyer device, an order for a quantity of the item for delivery to the delivery location.

At 1018, the computing device may determine that the quantity of the item possessed in the inventory of the first courier is greater than or equal to the quantity ordered.

At 1020, the computing device may send to the buyer device, a confirmation of the order.

At 1022, the computing device may send, to the first courier device, order information including an indication of the delivery location and the quantity of the item ordered. Upon receipt of the order information, the courier may proceed to the delivery location and deliver the indicated quantity of the item to the buyer at the delivery address.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 11:
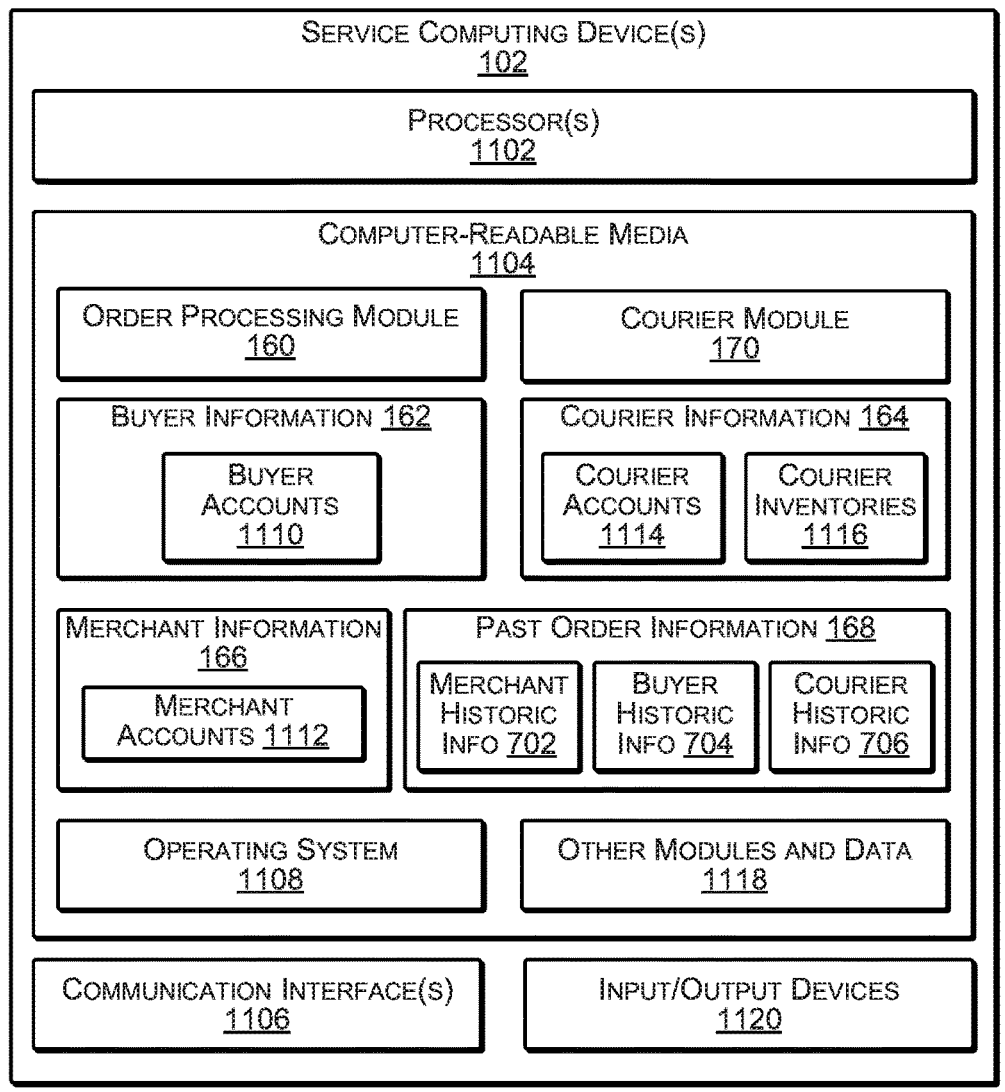
FIG. 11 illustrates select components of one or more example service computing devices according to some implementations.

FIG. 11 illustrates select components of the service computing device 102 that may be used to implement some functionality of the combined order processing services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 1102, one or more computer-readable media 1104, and one or more communication interfaces 1106. Each processor 1102 may be a single processing unit or a number of processing units, and may include single or multiple computing units or multiple processing cores. The processor(s) 1102 can be implemented as one or more microprocessors, microcomputers, microcontrollers, digital signal processors, central processing units, state machines, logic circuitries, and/or any devices that manipulate signals based on operational instructions. For instance, the processor(s) 1102 may be one or more hardware processors and/or logic circuits of any suitable type specifically programmed or configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 may include volatile and nonvolatile memory and/or removable and non-removable media implemented in any type of technology for storage of information, such as computer-readable instructions, data structures, program modules, or other data. Such computer-readable media 1104 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1104 may be a tangible non-transitory media to the extent that, when mentioned, non-transitory computer-readable media exclude media such as energy, carrier signals, electromagnetic waves, and signals per se.

The computer-readable media 1104 may be used to store any number of functional components that are executable by the processors 1102. In many implementations, these functional components comprise instructions or programs that are executable by the processors 1102 and that, when executed, specifically configure the one or more processors 1102 to perform the actions attributed above to the service computing device 102. Functional components stored in the computer-readable media 1104 may include the order processing module 160 and the courier module 170. Additional functional components stored in the computer-readable media 1104 may include an operating system 1108 for controlling and managing various functions of the service computing device 102.

In addition, the computer-readable media 1104 may store data used for performing the operations described herein. Thus, the computer-readable media 1104 may store the buyer information 162, including buyer accounts 1110, the merchant information 166, including merchant accounts 1112, and the courier information 164, including courier accounts 1114 and courier inventories 1116. Further, the computer-readable media 1104 may include the past order information 168, such as the merchant historic information 702, the buyer historic information 704, and the courier historic information 706. The service computing device 102 may also include or maintain other functional components and data not specifically shown in FIG. 11, such as other modules and data 1118, which may include programs, drivers, etc., and the data used or generated by the functional components. Further, the service computing device 102 may include many other logical, programmatic, and physical components, of which those described above are merely examples that are related to the discussion herein.

The communication interface(s) 1106 may include one or more interfaces and hardware components for enabling communication with various other devices, such as over the network(s) 106. For example, communication interface(s) 1106 may enable communication through one or more of the Internet, cable networks, cellular networks, wireless networks (e.g., Wi-Fi) and wired networks (e.g., fiber optic and Ethernet), as well as short-range communications, such as BLUETOOTH®, BLUETOOTH® low energy, and the like, as additionally enumerated elsewhere herein.

The service computing device 102 may further be equipped with various input/output (I/O) devices 1120. Such I/O devices 1120 may include a display, various user interface controls (e.g., buttons, joystick, keyboard, mouse, touch screen, etc.), audio speakers, connection ports and so forth.

Figure 12:
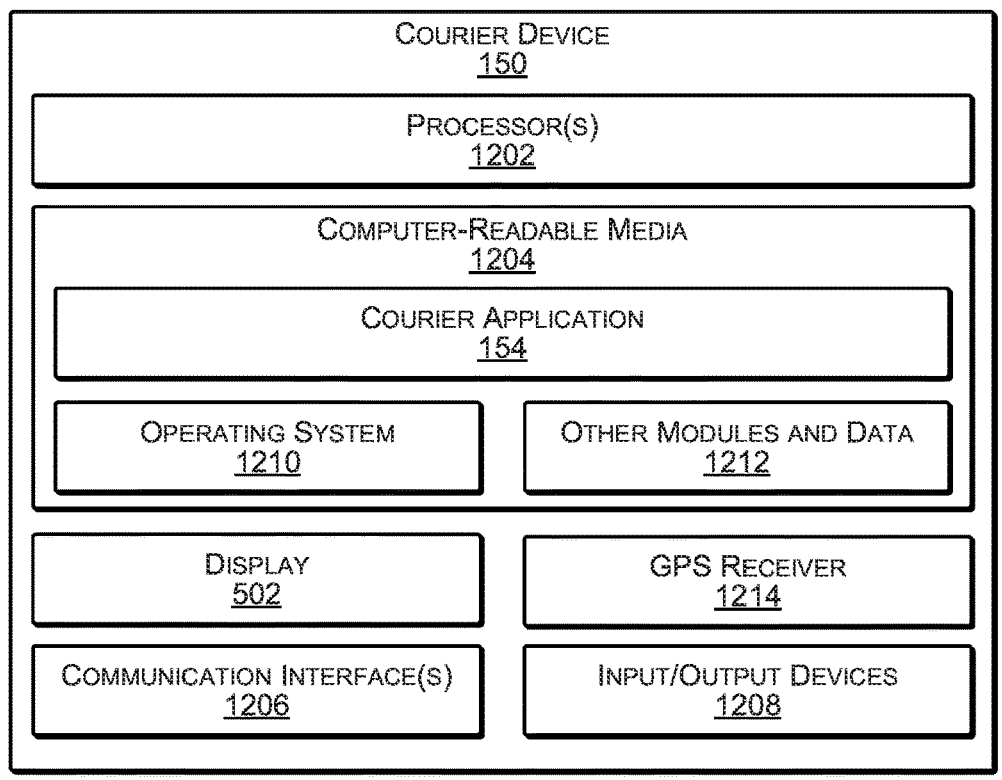
FIG. 12 illustrates select components of an example courier device according to some implementations.

FIG. 12 illustrates select example components of the courier device 150 that may implement the functionality described above according to some examples. The courier device 150 may be any of a number of different types of portable computing devices. Some examples of the courier device 150 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 12, the courier device 150 includes components such as at least one processor 1202, one or more computer-readable media 1204, one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable processor-executable instructions stored in the computer-readable media 1204.

Depending on the configuration of the courier device 150, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1204 may include, but is not limited to, RAM, ROM, EEPROM, flash memory, solid-state storage, magnetic disk storage, optical storage, and/or other computer-readable media technology. Further, in some cases, the courier device 150 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules, or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the courier device 150. Functional components of the courier device 150 stored in the computer-readable media 1204 include the courier application 154, as discussed above. Additional functional components may include an operating system 1210 for controlling and managing various functions of the courier device 150 and for enabling basic user interactions with the courier device 150.

In addition, the computer-readable media 1204 may also store data, data structures, and the like, that are used by the functional components. Depending on the type of the courier device 150, the computer-readable media 1204 may also optionally include other functional components and data, such as other modules and data 1212, which may include applications, programs, drivers, etc., and the data used or generated by the functional components. Further, the courier device 150 may include many other logical, programmatic, and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 12 further illustrates that the courier device 150 may include a display 502, which may be the any of various types of displays. The courier device 150 may further include the one or more I/O devices 1208. The I/O devices 1208 may include speakers, a microphone, a camera, and various user controls (e.g., buttons, a joystick, a keyboard, a keypad, etc.), a haptic output device, and so forth.

Other components included in the courier device 150 may include various types of sensors, which may include a GPS receiver 1214 able to indicate location information, as well as other sensors (not shown) such as an accelerometer, gyroscope, compass, proximity sensor, and the like. In some cases, the GPS receiver 1214 may be used by the courier application 154 to determine a current geographic location of the courier device 150. Additionally, or alternatively, the communication interfaces 1206 may be used to determine the current location of the courier device 150, such as based on communication with nearby cell towers, wireless access points, and the like. In some examples, the courier application 154 may send this location information periodically to the service computing device as an indicated location of the associated courier. Additionally, the courier device 150 may include various other components that are not shown, examples of which include removable storage, a power source, such as a battery and power control unit, and so forth.

Figure 13:
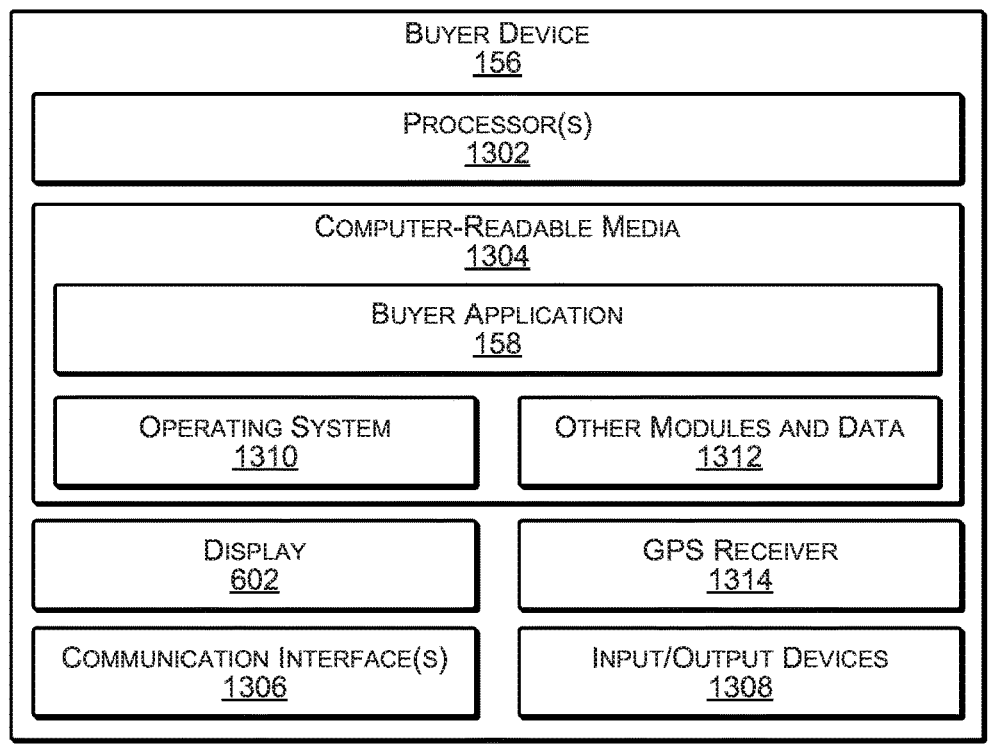
FIG. 13 illustrates select components of an example buyer device according to some implementations.

FIG. 13 illustrates select example components of the buyer device 156 that may implement the functionality described above according to some examples. The buyer device 156 may be any of a number of different types of computing devices. Some examples of the buyer device 156 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 156 may be a stationary or semi-stationary computing device, such as a desktop computer or other device with computing capabilities.

In the example of FIG. 13, the buyer device 156 includes components such as at least one processor 1302, one or more computer-readable media 1304, one or more communication interfaces 1306, and one or more input/output (I/O) devices 1308. Each processor 1302 may itself comprise one or more processors or processing cores. For example, the processor 1302 can be implemented as one or more microprocessors, microcomputers, microcontrollers, digital signal processors, central processing units, state machines, logic circuitries, and/or any devices that manipulate signals based on operational instructions. In some cases, the processor 1302 may be one or more hardware processors and/or logic circuits of any suitable type specifically programmed or configured to execute the algorithms and processes described herein. The processor 1302 can be configured to fetch and execute computer-readable processor-executable instructions stored in the computer-readable media 1304.

Depending on the configuration of the buyer device 156, the computer-readable media 1304 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1304 may include, but is not limited to, RAM, ROM, EEPROM, flash memory, solid-state storage, magnetic disk storage, optical storage, and/or other computer-readable media technology. Further, in some cases, the buyer device 156 may access external storage, such as RAID storage systems, storage arrays, network attached storage, storage area networks, cloud storage, or any other medium that can be used to store information and that can be accessed by the processor 1302 directly or through another computing device or network. Accordingly, the computer-readable media 1304 may be computer storage media able to store instructions, modules, or components that may be executed by the processor 1302. Further, when mentioned, non-transitory computer-readable media exclude media such as energy, carrier signals, electromagnetic waves, and signals per se.

The computer-readable media 1304 may be used to store and maintain any number of functional components that are executable by the processor 1302. In some implementations, these functional components comprise instructions or programs that are executable by the processor 1302 and that, when executed, implement operational logic for performing the actions and services attributed above to the buyer device 156. Functional components of the buyer device 156 stored in the computer-readable media 1304 may include the buyer application 158, as discussed above, which may present the buyer with one or more GUIs for placing an order, some examples of which are described above. Additional functional components may include an operating system 1310 for controlling and managing various functions of the buyer device 156 and for enabling basic user interactions with the buyer device 156.

In addition, the computer-readable media 1304 may also store data, data structures and the like, that are used by the functional components. Depending on the type of the buyer device 156, the computer-readable media 1304 may also optionally include other functional components and data, such as other modules and data 1312, which may include applications, programs, drivers, etc., and the data used or generated by the functional components. Further, the buyer device 156 may include many other logical, programmatic, and physical components, of which those described are merely examples that are related to the discussion herein.

The communication interface(s) 1306 may include one or more interfaces and hardware components for enabling communication with various other devices, such as over the network(s) 106 or directly. For example, communication interface(s) 1306 may enable communication through one or more of the Internet, cable networks, cellular networks, wireless networks (e.g., Wi-Fi) and wired networks (e.g., fiber optic, Ethernet), as well as short-range communications such as BLUETOOTH®, BLUETOOTH® low energy, and the like, as additionally enumerated elsewhere herein.

FIG. 13 further illustrates that the buyer device 156 may include the display 602, which may employ any suitable display technology. In some examples, the display 602 may have a touch sensor to provide a touchscreen display. The buyer device 156 may further include the one or more I/O devices 1308. The I/O devices 1308 may include speakers, a microphone, a camera, and various user controls (e.g., buttons, a joystick, a keyboard, a keypad, etc.), a haptic output device, and so forth. Other components included in the buyer device 156 may include various types of sensors, which may include a GPS receiver 1314 able to indicate location information, as well as other sensors (not shown) such as an accelerometer, gyroscope, compass, proximity sensor, and the like. In some cases, the GPS receiver 1314 may be used by the buyer application 158 to determine or confirm a current geographic location of the buyer device 156. Additionally, or alternatively, the communication interfaces 1306 may be used to determine the current location of the buyer device 156, such as based on communication with nearby cell towers, wireless access points, and the like. In some examples, the buyer application 158 may send this location information to the service computing device as an indicated delivery location for the associated buyer. Additionally, the buyer device 156 may include various other components that are not shown, examples of which include removable storage, a power source, such as a battery and power control unit, and so forth. Further, the merchant device may have components and hardware configurations similar to those of the buyer device, but with one or more different functional components.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:

determining, by a computing device, from stored past order information for a plurality of past orders for delivery of items to buyers, a group of past delivery locations that are within a threshold distance of each other;

determining, by the computing device, based on the group of past delivery locations and the past orders associated with respective past delivery locations of the group, a courier placement location in proximity to the group and a composition of an associated courier inventory including one or more first items from a first merchant and one or more second items from a second merchant;

receiving, by the computing device, based on information from respective GPS receivers of a plurality of courier devices, location information indicating geographic locations of the courier devices, wherein the courier devices include a first courier device associated with a first courier having picked up the one or more first items, a second courier device associated with a second courier having picked up the one or more second items, and a third courier device associated with a third courier to receive the courier inventory;

determining, by the computing device, a handoff location based at least in part on the indicated geographic location and a predicted travel time to the handoff location determined for at least one of the first courier device, the second courier device, or the third courier device; and sending, by the computing device, to the first courier device, the second courier device, and the third courier device, an indication of the handoff location to cause, at least in part, respective applications executing on the first courier device, the second courier device, and the third courier device to present the handoff location in respective user interfaces on respective displays of the first courier device, the second courier device, and the third courier device.

2. The method as recited in claim 1, further comprising determining the handoff location based at least in part on:
a first geographic location indicated for the first courier device, a second geographic location indicated for the second courier device, and a third geographic location indicated for the third courier device; and
further based at least in part on a first predicted courier travel time associated with the first courier device, a second predicted travel time associated with the second courier device, and a third predicted travel time associated with the third courier device.

3. The method as recited in claim 2, further comprising:
determining, from a plurality of courier geographic locations received in association with a plurality of past orders, a plurality of past courier travel times; and
predicting at least one of the first predicted courier travel time, the second predicted courier travel time, or the third predicted courier travel time based at least in part on the plurality of past courier travel times.

4. The method as recited in claim 1, further comprising:
determining the handoff location based at least in part on the courier placement location; and
sending, to the third courier device, courier placement location information that causes, at least in part, the application executing on the third courier device to present the courier placement location in the user interface on the third courier device.

5. The method as recited in claim 1, further comprising:
determining a plurality of courier placement locations, each courier placement location associated with a respective service area;
determining a centroid location corresponding to the plurality of courier placement locations; and
determining the handoff location based at least in part on the centroid location.

6. The method as recited in claim 1, further comprising:
determining the handoff location based at least in part on the geographic location indicted for a fourth courier device associated with a fourth courier, wherein the fourth courier is positioned at least temporarily at the handoff location; and
sending, to the fourth courier device, information about the first items and the second items to be delivered to the handoff location, information about the inventory, and an indicated timing for the third courier to pick up the inventory from the handoff location.

7. The method as recited in claim 1, wherein the determining the courier placement location further comprises:
determining, by the computing device,
a plurality of indicated buyer locations corresponding to accesses on respective buyer devices to respective applications for placing orders, wherein the plurality of indicated buyer locations are within another threshold distance of each other; and
determining the courier placement location or another courier placement location based on the indicated buyer locations.

8. The method as recited in claim 1, further comprising:
determining, from the plurality of past orders, a number of sales of the first item and a number of sales of the second item over a period of time; and
determining the courier inventory based at least in part on comparing the number of sales of the first item to the number of sales of the second item over the period of time.

9. The method as recited in claim 1, further comprising:
receiving, from the third courier device, the indicated location of the third courier device;
determining, from inventory information, that the third courier possesses a quantity of the first item and a quantity of the second item;
receiving, from a buyer device, an indication of a delivery location for placing an order;
determining, based at least in part on the received indicated location of the third courier device, that the third courier device is within a threshold delivery travel time to the delivery location; and
sending an indication to the buyer device that at least one first item and at least one second item are available to be ordered to cause, at least in part, the buyer device to present item information related to the first item and the second item.

10. One or more non-transitory computer-readable media maintaining instructions that, when executed by one or more processors, program the one or more processors to:
determine, from stored past order information for a plurality of past orders for delivery of items to buyers, a group of past delivery locations that are within a threshold distance of each other;
determine, based on the group of past delivery locations and the past orders associated with respective past delivery locations of the group, a courier placement location in proximity to the group and a composition of an associated courier inventory including one or more first items from a first merchant and one or more second items from a second merchant;
determine a handoff location based at least in part on the courier placement location and location information received from a plurality of courier devices determined based at least in part on information from location sensors of the plurality of courier devices; and
send, to the plurality of courier devices, location information indicating the handoff location, wherein the courier devices include a first courier device associated with a first courier having picked up the one or more first items, a second courier device associated with a second courier having picked up the one or more second items, and a third courier device associated with a third courier to receive the courier inventory, wherein sending the location information causes, at least in part, an application executing on at least one of the first courier device, the second courier device, or the third courier device to present the handoff location in a user interface on a display of the at least one of the first courier device, the second courier device, or the third courier device.

11. The one or more non-transitory computer-readable media as recited in claim 10, wherein the instructions further program the one or more processors to:
determine a plurality of the courier placement locations, each courier placement location associated with a respective service area;
determine a centroid location corresponding to the plurality of courier placement locations; and determine the handoff location based at least in part on the centroid location.

12. The one or more non-transitory computer-readable media as recited in claim 10, wherein the instructions further program the one or more processors to:
send, to a fourth courier device associated with a fourth courier, the location information indicating the handoff location, wherein the fourth courier is positioned at least temporarily at the handoff location;
send, to the fourth courier device, information about the first items and the second items to be delivered to the handoff location, information about the inventory, and an indicated timing for the third courier to pick up the inventory from the handoff location; and
receive, from the fourth courier device, an indication that the first items and the second items have been received at the handoff location.

13. The one or more non-transitory computer-readable media as recited in claim 10, wherein the instructions further program the one or more processors to determine the courier placement location by:
determining
a plurality of indicated buyer locations corresponding to accesses on respective buyer devices to respective applications for placing orders, wherein the plurality of indicated buyer locations are within another threshold distance of each other;
and
determining the courier placement location or another courier placement location based on the indicated buyer locations.

14. The one or more non-transitory computer-readable media as recited in claim 13, wherein the instructions further program the one or more processors to:
determine the courier placement location by determining at least one centroid location for the at least one of the indicated buyer locations or the past delivery locations; and
send, to the third courier device, courier placement location information that causes, at least in part, the application executing on the third courier device to present the courier placement location in the user interface on the third courier device.

15. The one or more non-transitory computer-readable media as recited in claim 10, wherein the instructions further program the one or more processors to:
determine, from the plurality of past orders, a number of sales of the first item and a number of sales of the second item over a period of time; and
determine the courier inventory based at least in part on comparing the number of sales of the first item to the number of sales of the second item over the period of time.

16. The one or more non-transitory computer-readable media as recited in claim 10, wherein the instructions further program the one or more processors to:
receive, from the third courier device, the indicated location of the third courier device;
determine, from inventory information, that the third courier possesses a quantity of the first item and a quantity of the second item;
receive, from a buyer device, an indication of a delivery location for placing an order;
determine, based at least in part on the received indicated location of the third courier device, that the third courier device is within a threshold delivery travel time to the delivery location; and
send an indication to the buyer device that at least one first item and at least one second item are available to be ordered to cause, at least in part, the buyer device to present item information related to the first item and the second item.

17. The one or more non-transitory computer-readable media as recited in claim 10, wherein the instructions further program the one or more processors to:
receive, from a buyer device, an indication of a delivery location for placing an order;
determine, based on received indication of geographic locations for each of a plurality of courier devices, that a predicted delivery travel time to the indicated delivery location is greater than a threshold delivery travel time; and
send an indication to the buyer device that the item is unavailable to be ordered.

18. A system comprising:
one or more processors; and
one or more non-transitory computer-readable media programmed by executable instructions to perform operations comprising:
determining, from stored past order information for a plurality of past orders for delivery of items to buyers, a group of past delivery locations that are within a threshold distance of each other;
determining, based on the group of past delivery locations and the past orders associated with respective past delivery locations of the group, a courier placement location in proximity to the group and a composition of an associated courier inventory including one or more first items from a first merchant and one or more second items from a second merchant;
receiving, based on information from respective location sensors of a plurality of courier devices, location information indicating geographic locations of the courier devices, wherein the courier devices include a first courier device associated with a first courier having picked up the one or more first items, a second courier device associated with a second courier having picked up the one or more second items, and a third courier device associated with a third courier to receive the courier inventory;
determining, a handoff location based at least in part on the indicated geographic location determined for at least one of the first courier device, the second courier device, or the third courier device; and
sending, to the first courier device, the second courier device, and the third courier device, an indication of the handoff location to cause, at least in part, respective applications executing on the first courier device, the second courier device, and the third courier device to present the handoff location in respective user interfaces on respective displays of the first courier device, the second courier device, and the third courier device.

19. The system as recited in claim 18, the operations further comprising determining the handoff location based at least in part on:
a first geographic location indicated for the first courier device, a second geographic location indicated for the second courier device, and a third geographic location indicated for the third courier device; and
further based at least in part on a first predicted courier travel time to the handoff location associated with the first courier device, a second predicted travel time to the handoff location associated with the second courier device, and a third predicted travel time to the handoff location associated with the third courier device.

20. The system as recited in claim 18, the operations further comprising sending, to the third courier device, courier placement location information that causes, at least in part, the application executing on the third courier device to present the courier placement location in the user interface on the third courier device.

21. The system as recited in claim 18, the operations further comprising
   determining the handoff location based at least in part on the geographic location indicted for a fourth courier device associated with a fourth courier, wherein the fourth courier is positioned at least temporarily at the handoff location; and
   sending, to the fourth courier device, information about the first items and the second items to be delivered to the handoff location, information about the inventory, and an indicated timing for the third courier to pick up the inventory from the handoff location.

* * * * *